US008732854B2

(12) United States Patent
Cholas et al.

(10) Patent No.: US 8,732,854 B2
(45) Date of Patent: May 20, 2014

(54) METHODS AND APPARATUS FOR PREMISES CONTENT DISTRIBUTION

(75) Inventors: Chris Cholas, Frederick, CO (US); William L. Helms, Longmont, CO (US); John B. Carlucci, Boulder, CO (US); Jeffrey P. Markley, Golden, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1797 days.

(21) Appl. No.: 11/592,054

(22) Filed: Nov. 1, 2006

(65) Prior Publication Data
US 2008/0112405 A1 May 15, 2008

(51) Int. Cl.
*H04L 29/06* (2006.01)

(52) U.S. Cl.
USPC ............... 726/29; 726/27; 726/31; 726/32; 726/33; 705/51; 725/46; 725/109; 725/110; 725/111

(58) Field of Classification Search
CPC ............. G06F 21/10; H04L 2463/101; H04L 2209/603; H04L 63/10; H04L 2209/60
USPC .......................................................... 726/26
See application file for complete search history.

(56) References Cited

U.S. PATENT DOCUMENTS

| 5,369,707 | A | 11/1994 | Follendore, III |
|---|---|---|---|
| 5,577,209 | A | 11/1996 | Boyle et al. |
| 5,715,403 | A | 2/1998 | Stefik |
| 5,787,172 | A | 7/1998 | Arnold |
| 5,828,832 | A | 10/1998 | Holden et al. |
| 5,870,474 | A | 2/1999 | Wasilewski et al. |
| 6,148,400 | A | 11/2000 | Arnold |
| 6,154,844 | A | 11/2000 | Touboul et al. |
| 6,157,719 | A | 12/2000 | Wasilewski et al. |
| 6,167,521 | A | 12/2000 | Smith et al. |
| 6,212,636 | B1 | 4/2001 | Boyle et al. |
| 6,233,341 | B1 | 5/2001 | Riggins |
| 6,256,393 | B1 | 7/2001 | Safadi et al. |

(Continued)

FOREIGN PATENT DOCUMENTS

| EP | 1139198 A2 * | 10/2001 | ............... G06F 1/00 |
|---|---|---|---|
| JP | 8-263440 | 11/1996 | |

(Continued)

OTHER PUBLICATIONS

Bostjan Marusic et al. "Share it!—Content Transfer in Home-to-Home Networks." IEEE MELECON 2004, May 12-15, 2004, Dubrovnik, Croatia.*

(Continued)

*Primary Examiner* — Taghi Arani
*Assistant Examiner* — Narciso Victoria
(74) *Attorney, Agent, or Firm* — Gazdzinski & Associates, PC

(57) ABSTRACT

Apparatus and methods for protected content access, browsing and transfer over a network. In one embodiment, the network comprises a premises (e.g., residential) LAN, and the apparatus comprises a server and renderer consumer premise equipment (CPE). The renderer CPE scans the network to search for a server CPE that implement a compatible security framework. The renderer authenticates itself with the server, and the server allows content browsing and selection access only to an authorized and authenticated renderer. A negotiation and exchange protocol comprises messages exchanged between the renderer and the server that include one or more of device identification, encryption key exchange, digital certificates and information regarding security package used by each CPE.

36 Claims, 18 Drawing Sheets

(56) References Cited

U.S. PATENT DOCUMENTS

| | | | |
|---|---|---|---|
| 6,266,421 B1 | 7/2001 | Domyo et al. | |
| 6,456,716 B1 | 9/2002 | Arnold | |
| 6,601,171 B1 | 7/2003 | Carter et al. | |
| 6,760,768 B2 | 7/2004 | Holden et al. | |
| 6,785,810 B1 | 8/2004 | Lirov et al. | |
| 6,807,573 B2 | 10/2004 | Saito et al. | |
| 6,813,505 B2 | 11/2004 | Walley et al. | |
| 6,859,535 B1 | 2/2005 | Tatebayashi et al. | |
| 6,898,708 B2 | 5/2005 | Hori et al. | |
| 6,910,064 B1* | 6/2005 | Astarabadi et al. | 709/203 |
| 6,948,183 B1 | 9/2005 | Peterka | |
| 6,954,632 B2 | 10/2005 | Kobayashi | |
| 6,975,730 B1 | 12/2005 | Kuroiwa et al. | |
| 6,996,544 B2 | 2/2006 | Sellars et al. | |
| 7,017,189 B1 | 3/2006 | De Mello | |
| 7,054,443 B1 | 5/2006 | Jakubowski et al. | |
| 7,073,199 B1 | 7/2006 | Raley | |
| 7,103,181 B2 | 9/2006 | Ananth | |
| 7,237,112 B1 | 6/2007 | Ishiguro et al. | |
| 7,257,227 B2 | 8/2007 | Chen et al. | |
| 7,266,726 B1 | 9/2007 | Ladd | |
| 7,299,502 B2 | 11/2007 | Schmeling et al. | |
| 7,324,531 B2 | 1/2008 | Cho | |
| 7,373,506 B2 | 5/2008 | Asano et al. | |
| 7,409,546 B2 | 8/2008 | Platt | |
| 7,506,367 B1 | 3/2009 | Ishibashi | |
| 7,673,004 B1* | 3/2010 | Sherstinsky et al. | 709/206 |
| 7,707,644 B2* | 4/2010 | Choi et al. | 726/27 |
| 7,757,101 B2 | 7/2010 | Nonaka et al. | |
| 7,783,891 B2 | 8/2010 | Perlin et al. | |
| 7,865,440 B2 | 1/2011 | Jaquette | |
| 2001/0014946 A1 | 8/2001 | Ichinoi | |
| 2001/0019614 A1 | 9/2001 | Madoukh | |
| 2001/0029581 A1 | 10/2001 | Knauft | |
| 2001/0053223 A1 | 12/2001 | Ishibash et al. | |
| 2001/0053226 A1 | 12/2001 | Akins et al. | |
| 2001/0056541 A1 | 12/2001 | Matsuzaki et al. | |
| 2002/0026575 A1 | 2/2002 | Wheeler et al. | |
| 2002/0183985 A1 | 12/2002 | Hori et al. | |
| 2003/0009681 A1 | 1/2003 | Harada et al. | |
| 2003/0021421 A1 | 1/2003 | Yokota et al. | |
| 2003/0046560 A1 | 3/2003 | Inomata | |
| 2003/0056217 A1 | 3/2003 | Brooks | |
| 2003/0074571 A1 | 4/2003 | Fujiwara et al. | |
| 2003/0084003 A1 | 5/2003 | Pinkas et al. | |
| 2003/0097340 A1 | 5/2003 | Okamoto et al. | |
| 2003/0140227 A1 | 7/2003 | Asano et al. | |
| 2003/0163697 A1 | 8/2003 | Pabla et al. | |
| 2003/0187799 A1 | 10/2003 | Sellars et al. | |
| 2003/0208763 A1 | 11/2003 | McElhatten | |
| 2003/0217365 A1 | 11/2003 | Caputo | |
| 2004/0078602 A1 | 4/2004 | Rothbarth et al. | |
| 2004/0088558 A1 | 5/2004 | Candelore | |
| 2004/0123129 A1 | 6/2004 | Ginter et al. | |
| 2004/0128499 A1 | 7/2004 | Peterka et al. | |
| 2004/0181800 A1 | 9/2004 | Rakib et al. | |
| 2004/0224425 A1 | 11/2004 | Gjerde | |
| 2004/0261093 A1 | 12/2004 | Rebaud et al. | |
| 2004/0268386 A1* | 12/2004 | Logan et al. | 725/34 |
| 2005/0005287 A1 | 1/2005 | Claussen | |
| 2005/0021985 A1 | 1/2005 | Ono et al. | |
| 2005/0022227 A1 | 1/2005 | Shen et al. | |
| 2005/0039212 A1 | 2/2005 | Baran et al. | |
| 2005/0097006 A1* | 5/2005 | Nyako | 705/26 |
| 2005/0114900 A1 | 5/2005 | Ladd | |
| 2005/0138357 A1* | 6/2005 | Swenson et al. | 713/155 |
| 2005/0169468 A1 | 8/2005 | Fahrny et al. | |
| 2005/0177740 A1 | 8/2005 | Athaide et al. | |
| 2005/0177741 A1 | 8/2005 | Chen et al. | |
| 2005/0182931 A1 | 8/2005 | Robert et al. | |
| 2005/0190912 A1 | 9/2005 | Hopkins et al. | |
| 2005/0195975 A1 | 9/2005 | Kawakita | |
| 2005/0198693 A1 | 9/2005 | Choi et al. | |
| 2005/0278259 A1 | 12/2005 | Gunaseelan et al. | |
| 2006/0020786 A1 | 1/2006 | Helms et al. | |
| 2006/0020950 A1 | 1/2006 | Ladd | |
| 2006/0036750 A1 | 2/2006 | Ladd | |
| 2006/0041903 A1 | 2/2006 | Kahn et al. | |
| 2006/0047957 A1 | 3/2006 | Helms | |
| 2006/0064583 A1 | 3/2006 | Birnbaum et al. | |
| 2006/0130107 A1 | 6/2006 | Gonder | |
| 2006/0130113 A1 | 6/2006 | Carlucci | |
| 2006/0137015 A1 | 6/2006 | Fahrny et al. | |
| 2006/0179138 A1 | 8/2006 | Van Gassel et al. | |
| 2006/0184972 A1 | 8/2006 | Rafey et al. | |
| 2006/0212400 A1 | 9/2006 | Kamperman et al. | |
| 2006/0218604 A1 | 9/2006 | Riedl | |
| 2007/0022459 A1 | 1/2007 | Gaebel | |
| 2007/0079381 A1 | 4/2007 | Hartung et al. | |
| 2007/0094691 A1 | 4/2007 | Gazdzinski | |
| 2007/0204314 A1 | 8/2007 | Hasek | |
| 2007/0206799 A1 | 9/2007 | Wingert et al. | |
| 2007/0217436 A1 | 9/2007 | Markley | |
| 2007/0276925 A1 | 11/2007 | LaJoie | |
| 2008/0098212 A1 | 4/2008 | Helms | |
| 2008/0103977 A1* | 5/2008 | Khosravy et al. | 705/59 |

FOREIGN PATENT DOCUMENTS

| | | |
|---|---|---|
| JP | 2000-156676 | 6/2000 |
| JP | 2000-332746 | 11/2000 |
| JP | 2001-274788 | 10/2001 |
| JP | A-2001-285821 | 10/2001 |
| JP | 2002-163396 | 6/2002 |
| JP | 2003-58657 | 2/2003 |
| JP | 2003-162600 | 6/2003 |
| JP | 2003-233690 | 8/2003 |
| JP | 2003-296484 | 10/2003 |
| JP | A-2003-348508 | 12/2003 |
| JP | 2004-72721 | 3/2004 |
| JP | 2004-120738 | 4/2004 |
| JP | 2004-030111 | 10/2004 |
| WO | WO 01/37479 | 5/2001 |
| WO | WO 01/69842 | 9/2001 |
| WO | WO 01-77778 | 10/2001 |
| WO | WO 02-13032 | 2/2002 |
| WO | WO 02/21841 | 3/2002 |
| WO | WO 02/42966 | 5/2002 |
| WO | WO 03/093944 | 11/2003 |
| WO | WO 2004-027622 | 4/2004 |
| WO | WO 2006/020141 | 2/2006 |

OTHER PUBLICATIONS

Van Moffaret, et al. ("*Digital Rights Management: DRM is a key enabler for the future growth of the broadband access market and the telecom/networking market in general*", Alcatel Telecommunications Review, Alcatel, Paris Cedex FR, Apr. 1, 2003, XP007005930ISSN; 1257-7167; hereinafter "Moffaret").

Zhang, et al. ("*A flexible content protection system for media-on-demand*" Multimedia Software Engineering, 2002 Proceedings. Fourth International Symposium on Dec. 11-13, 2002, Piscataway, NJ, USAA, IEEE, Dec. 11, 2002, pp. 272-277, XP010632760 ISBN: 978-0-7695-1857-2; hereinafter "Zhang").

Van Moffaret, et al. ("*Digital Rights Management—DRM is a key enabler for the future growth of the broadband access market and the telecom/networking market in general*", Alcatel Telecommunications Review, Alcatel, Paris Cedex FR, Apr. 1, 2003, XP007005930ISSN: 1267-7167; hereinafter "Moffarert").

5C Digital Transmission Content Protection White Paper, Hitachi, Ltd., et al., dated Jul. 14, 1998, 15 pages, cited by other.

High-bandwidth Digital Content Protection System, Revision 1.091, dated Apr. 22, 2003, Digital Content Protection LLC Draft, 78 pages, cited by other.

Digital Video Broadcasting, (DVB); DVB SimulCrypt; Part I: "Head-end architecture and synchronization" Technical Specification—ETSI TS 101 197 V.1 (Feb. 2002), 40 pages, cited by other.

Federal Information Processing Standards Publication, US FIPS PUB 197, Nov. 26, 2001, "Advanced Encryption Standards (AES)," 47 pages, cited by other.

(56) References Cited

OTHER PUBLICATIONS

DCAS Authorized Service Domain, Version 1.2, dated Nov. 30, 2005, 54 pages, cited by other.
DCAS Licensed Specification Abstracts, CableLabs Confidential Information, Jan. 12, 2006, 4 pages, cited by other.
RealSystem Media Commerce Suite Technical White Paper, Copyrgt. 2001 RealNetworks, Inc., 16 pages, http://www.realnetworks.com, cited by other.
DVB (Digital Video Broadcasting), DVB Document A045 Rev. 3, Jul. 2004, "Head-end Implementation of SimulCrypt," 289 pages.

* cited by examiner

METHODS AND APPARATUS FOR PREMISES CONTENT DISTRIBUTION

RELATED APPLICATIONS

This application is related to co-owned and co-pending U.S. patent application Ser. No. 11/006,404 filed Dec. 7, 2004 and entitled "Technique For Securely Communicating And Storing Programming Material In A Trusted Domain", and U.S. patent application Ser. No. 11/584,208 filed Oct. 20, 2006 and entitled "Downloadable Security And Protection Methods And Apparatus", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content (e.g., multimedia, audiovisual, data, applications, etc.) delivery over a network. Specifically, in one aspect, the invention relates to the methods and apparatus for enforcing digital rights within a premises network where a variety of devices implementing different security packages may be in communication with one another.

2. Description of Related Technology

Recent advances in digital information processing have made a wide range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high-speed Internet access and IP-based telephony (e.g., VOIP). Other services available to network users include access to and recording of digital music (e.g., MP3 files), as well local area networking (including wire-line and wireless local area networks) for distributing these services throughout the user's premises, and beyond.

Increased deployment of wireless interfaces such as WiFi, WiMAX and Bluetooth have also increased the prevalence and opportunity for ad hoc networking; i.e., substantially spontaneous or flexible network topologies between as few as two different entities.

Currently, many of these services are provided and delivered to the user via a wide variety of different equipment environments including, inter alia, cable modems, WiFi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VOIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is quite limited.

Furthermore, the movement of content delivered by these services within the user's premises (or even outside) is substantially frustrated, largely due to concerns relating to protection of valuable (e.g., copyrighted) content and surreptitious reproduction and distribution. Such unauthorized reproduction and distribution not only detracts from the network operator's revenue and commercial viability, but also that of the content source (e.g., movie studio, recording studio/artist, etc.).

Moreover, the lack of a comprehensive and effective scheme for control of content within the user domain effectively precludes content providers from releasing new content over cable or satellite networks contemporaneous with its availability over retail or rental outlets, due in large part to unauthorized access, reproduction and distribution concerns. Stated simply, new release content availability over cable typically lags that of rental/retail, due in large part to the lack of an effective control mechanism for the content once it is delivered to the user domain.

Accordingly, a number of existing technologies have heretofore been developed employed by network operators in order to attempt to frustrate surreptitious access, copying and distribution of valuable content. These technologies include: (i) conditional access (CA), (ii) encryption, (iii) the establishment of trusted domains (TDs), and (iv) digital rights management (DRM).

Conditional Access

Conditional access (CA) technologies are typically incorporated into content-based networks, such technologies including the digital encoding of various types of data including audio and video programming and music. Conditional access can generally be defined as the control of when and how a user may view and use the associated programming or information. Different types of conditional access may be desirable in a network delivery system in order to, e.g., accommodate improvements in the technology over time, as well as different conditional access attributes such as security and category of programming or user access level.

A variety of traditional methods of conditional access exist including, e.g., "Powerkey", NDS, and DigiCipher. A generalized conditional access model is also provided by the well-known DVB (Digital Video Broadcasting) Specification TS 101 197 V1.2.1 (02/02), DVB SimulCrypt; Part 1: "Head-end architecture and synchronization", and TS 103 197 V1.2.1 (02/02): "Head-end Implementation of SimulCrypt", each incorporated herein by reference in its entirety. These can be implemented using, for example, the so-called "CableCard" plug-in security module access technology (also known as a "a point-of-deployment (POD) module"). See, e.g., the CableCard-Host interface specification, which defines the interface between a digital cable receiver or STB (Host device) and the CableCard device provided by the MSO/cable operator. CableCard was developed to satisfy certain security requirements to allow retail availability of host devices, e.g., set-top boxes, digital cable ready televisions, DVRs, personal computers (PCs), integrated digital televisions, etc., for receiving cable services. The CableCard, comprising a PCM-CIA device, can be inserted into a host device, allowing a viewer to receive cable systems' secure digital video services, e.g., pay per view TV, electronic program guides, premium subscription channels, etc.

Specifically, the CableCard contains conditional access functionality, as well as the capability of converting messages to a common format. Thus, the CableCard provides a cable operator with a secure device at the subscriber premises, and acts as a translator so that the host device needs to understand a single protocol, regardless of the type of the network to which it is connected.

Encryption

In many content-based networks (e.g., cable television systems), the client device or consumer premises equipment (CPE) receives, through the cable TV network, programming content which may be encrypted, e.g., in accordance with the data encryption standard (DES) technique or Advanced Encryption Standard (AES), to secure its delivery.

DES is a well-known symmetrical cipher that utilizes a single key for both encryption and decryption of messages. Because the DES algorithm is publicly known, learning the DES key would allow an encrypted message to be read by anyone. As such, both the message sender and receiver must keep the DES key a secret from others. A DES key typically is a sequence of eight bytes, each containing eight bits. To enhance the DES integrity, the DES algorithm may be applied successive times. With this approach, the DES algorithm enciphers and deciphers data, e.g., three times in sequence, using different keys, resulting in a so-called triple DES (3DES) technique.

The Advanced Encryption Standard (AES), also known as Rijndael, is a block cipher adopted as an encryption standard by many entities including the U.S. government. It is used worldwide, as is the case with its predecessor, DES. AES was adopted by National Institute of Standards and Technology (NIST) and was codified as US FIPS PUB 197 in November 20 AES provides a much higher level of encryption than DES or 3DES, and hence is increasingly being integrated into applications where strong protection is desired, including the delivery of content over cable or other content-based networks.

In contrast to the DES or AES techniques, a public key encryption technique, e.g., an RSA technique (named for its developers, Rivest, Shamir, and Adleman), uses two different keys. A first key, referred to as a private key, is kept secret by a user. The other key, referred to as a public key, is available to anyone wishing to communicate with the user in a confidential manner. The two keys uniquely match each other, collectively referred to as a "public key-private key pair." However, the private key cannot be easily derived from the public key. A party wishing to send a message to the user may utilize the public key to encrypt a message before transmitting it. The user then utilizes the private key to decrypt the message. Conversely, the private key may be used to encrypt a message, in which case the message can subsequently be decrypted with the public key. For example, the keys for the RSA algorithm are mathematically generated, in part, by combining prime numbers. The security of the RSA algorithm, and the like, depends on the use of very large numbers for its keys, which typically are 512 bits long or longer.

"Trusted Domains"

Another related approach for content protection comprises the creation and enforcement of a "trusted domain" or TD. Specifically, such a trusted domain comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the headend, HFC delivery network, etc.,) but also user devices or CPE 106 at subscribers' premises which are capable of receiving and securely storing programming content. Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

One exemplary approach of implementing a trusted domain, described in co-owned and co-pending U.S. patent application Ser. No. 11/006,404 filed Dec. 7, 2004 and entitled "Technique For Securely Communicating And Storing Programming Material In A Trusted Domain" (TWC 03-17), which is incorporated herein by reference in its entirety, comprises using two cryptographic elements (e.g., encryption keys), associated with a user and his/her client device(s), respectively, that control access to content stored in the client device(s) within the domain. The trusted domain is preserved with respect to the stored content so long as the content remains encrypted and continues to be managed under the prescribed key management methodology, regardless of which device stores the content. Once the content itself is decrypted, e.g., by a conditional access (CA) mechanism when data is sent from the DVR CPE to a television monitor for display, the decrypted content is no longer within the trusted domain.

Closely related to the concept of a trusted domain is the so-called ASD or "Authorized Service Domain". ASD is a digital content management technology that is used by cable operators to protect their distributed content. ASD is defined by NGNA and CableLabs, and specifies a protocol for devices to exchange content protection information and/or security packages. These security packages typically pertain to service entitlement packages on the cable network. The security mechanism utilized with the ASD framework is typically tied to the security credentials of a multi-stream CableCard (see discussion of CA above), or secure microprocessor (SM) under the so-called DCAS or Downloadable Conditional Access System paradigm.

Digital Rights Management (DRM)

Another approach used to control the distribution and use of protected content within a content-based network is to employ so-called digital rights management (DRM). For example, Media rights management systems such as the Microsoft Windows® Media Digital Rights Manager (DRM), may be used as well. The Windows® Media Player Version 9 comprises audio and video codecs, the Windows Media Encoder, Windows Media Server, Windows Media Software Development Kit (SDK), Digital Rights Management (DRM) technology, and an extensibility model that allows integration into third-party solutions.

According to one such DRM approach, a digital media or content file is encrypted and locked with a "license key." The license key is stored in a license file or other data structure which is distributed separately from the media or content. A user can obtain the encrypted media file by, e.g., downloading it from a web site, purchasing it on a physical media, etc. To play the digital media file, the user must first acquire the license file including the license key for that media file. The user acquires the license key by accessing a pre-delivered license (which includes license terms or policies). Alternatively, when the user plays the file for the first time, a procedure is invoked for retrieving the license via a network connection or other delivery mode (e.g., the Internet). After obtaining the license with the license key, the user is able to access the media file according to the rules or rights specified in the license policies.

Another approach to DRM (see, e.g., the RealNetworks "Helix" Platform and Community approach) comprises encrypting a content file (typically performed by the system operator) to create a secured content file, thereby requiring a cryptographic key to access the content in the file. The key is included within a retailer's database, and the secured content file is distributed to users by, e.g., Internet connection or offline distribution of CDs. The retailer itself sets usage rules and policies for licensing the content. A user contacts the retailer's web server, such as via a trusted software client, in order to obtain a license to access the encrypted content. The retailer's web server requests certain rights from the operator's license server, the latter which creates a license containing the key for the requested content file. This license is given to the retailer (e.g. via the web server), which delivers the license to the trusted client of the user. The trusted client retrieves the content file, and uses the received key to access the content.

"Plug and Play" Technologies

A number of different approaches to device data interface are known in the prior art. More recently, so-called "plug and play" technologies have evolved in order to facilitate the ability for a user to connect two or more devices together (including related controllers, or "control points"), and effectively have them be configured appropriately for communication without further user intervention. One of the best known of these technologies is the Universal Plug and Play (UPnP) approach, which comprises a set of protocols that allow devices to connect seamlessly in a peer-to-peer fashion and exchange data, and also to simplify the implementation of networks in the home and enterprise environments. This seamless connectivity is accomplished in large part via use of device control protocols built upon open, Internet-based communication standards such as TCP/IP, UDP and HTTP.

Hallmarks of UPnP include (i) media and device independence, (ii) operating system and programming language independence, and (iii) lack of specific device drivers. UPNP does not constrain the design of application programming interfaces (APIs) for applications running on interface control points. UPNP enables control over device user interface and interaction using a browser, as well as conventional application programmatic control.

The UPNP architecture also supports zero-configuration and automatic discovery, whereby a device can dynamically join a network, obtain an address, announce itself, convey its capabilities upon request, and learn about the presence and capabilities of other devices.

Deficiencies With The Prior Art

Conditional access (CA) paradigms currently in use, such as the aforementioned Powerkey and DigiCipher approaches, are restricted in their scope and not generally extensible beyond the user's set-top box or the equipment used to obtain digital content from a network service. So, for example, the user would generally be prohibited from transferring streamed or downloaded content to their WiFi enabled laptop or PC, or via a USB or FireWire port, since proper conditional access and content protection support does not exist in these devices or by virtue of the interfaces themselves.

Accordingly, content sharing between "authorized" devices is typically performed in the prior art over a vendor-specific or proprietary interface that is specific to a given conditional access system deployed in that network. As previously discussed, the Authorized Service Domain (ASD) sets forth a protocol for devices to exchange content protection information and security packages on, e.g., cable networks. These security packages may pertain, for example, to access or entitlement packages for services on the cable network. However, no mechanism or protocol is provided under the ASD approach (or otherwise) for the protected access and distribution of content on a premises network, especially one serving devices having potentially diverse hardware, software, and security environments.

For example, in a typical home networking environment, content delivered to and stored at the premises (e.g., on a DVR) needs to be delivered to multiple rooms or devices within or associated with the premises. Such "multi-room" DVR or protected content transfer between devices within or associated with the home requires a secure and user-implemented mechanism for exchanging security information. Ultimately, credentials of the devices in the home network have to be verified against a "trusted" device list within the operator network (e.g., at the cable head end) or another authentication node. Using prior art approaches, this has the disability of being overly centralized and hence somewhat inflexible, especially with respect to premises networks which may be both high dynamic in their topology or participants, as well as high heterogeneous in terms of their hardware/software environments, including within the premises network itself (e.g., a WiFi AP may distribute content to a laptop or hand-held computer via a wireless link, or a converged premises device may interface with any number of other devices such as DSTBs, laptops, cable ready televisions, DVRs, etc. using two or more communication media such as indigenous coaxial cable, CAT-5 cabling, wireless, etc.). Hence, premises networks are highly dynamic and often composed of many different types of devices, thereby requiring both a flexible and substantially "universal" mechanism for security information exchange and control/transfer of protected content.

Thus, improved apparatus and methods for facilitating the distribution of digital content within a user premises are needed. Such improved apparatus and methods would ideally operate at the application level (thereby allowing ready implementation on any number of different platforms and environments in a substantially agnostic fashion), and provide users the ability to browse and transfer content between equipment with different vendor's security package implementations.

Such improved apparatus and methods would also preferably be implemented in a manner that is both substantially automated and transparent to the user, and which can leverage the capabilities of existing or planned industry-standard interface technologies such as Universal Plug and Play (UPnP) if desired.

SUMMARY OF THE INVENTION

The present invention addresses the foregoing needs by disclosing apparatus and methods useful for managing and distributing content within a premises (and beyond), including inter alia (i) storing secure content, (ii) detecting devices or entities in communication with a premises network that have compatible security framework, (iii) browsing secure content within such devices or entities; and (iv) transfer of secure content to and from authorized devices.

In a first aspect of the invention, a method of sharing protected digital content between two devices associated with a network is disclosed. In one embodiment, the method comprises: storing digital content at a first of the two devices;

authenticating a second of the devices requesting access to the digital content from the first device; selectively providing access to the requesting device for browsing the digital content; receiving a request for transmission of at least a portion of the content; and selectively transmitting the at least portion of the content to the requesting device while maintaining the content protection. In one variant, the network comprises a premises local area network (LAN), and at least the acts of authenticating, providing access, and transmitting are performed without access to a head-end process of a cable television network with which at least a portion of the LAN is in communication.

In another variant, the stored digital content comprises a plurality of media files each having a respective substantially unique title, and the act of selecting providing access for browsing comprises providing access to at least the titles.

In another variant, the method further comprises verifying that the second device comprises adequate security provisions for protecting the content before the act of transferring is commenced.

In still another variant, the first and second devices comprise an authorized service domain (ASD) for maintaining the protection of the protected content.

In yet another variant, the method further comprises placing the first and second devices in data communication with one another via a substantially standardized communications interface. The communications interface comprises a Universal Plug and Play (UPnP) interface, and the first device completes the authentication using a substantially standardized security architecture.

In a second aspect of the invention, premises content server apparatus configured for data communication with one or more devices over a premises network is disclosed. In one embodiment, the server apparatus comprises: storage apparatus configured to store a plurality of digital content; authentication apparatus configured to authenticate at least one device requesting content from the server apparatus; browsing apparatus adapted to provide browsing of the plurality of content by the at least one requesting device; and security apparatus adapted to control access to the content by the browsing apparatus based at least in part on successful authentication of the at least one requesting device.

In one variant, the server apparatus further comprises transmission apparatus, the transmission apparatus adapted to transfer at least a portion of the plurality of content to the requesting device based at least in part on the successful authentication thereof. The transmission apparatus comprises a plug-and-play operable data interface, and the transfer of the at least portion of content is further based on the security apparatus determining that the requesting device possesses suitable security apparatus to protect at least one aspect of the at least portion of content to be transferred.

In another variant, the authentication apparatus and security apparatus comprise at least one computer program disposed on the server apparatus within a security architecture. The security architecture comprises a secure microprocessor, and the server apparatus comprises at least a portion of a trusted domain (TD).

In still another variant, the server apparatus is granted access to the digital content based at least in part on cryptographic elements and encrypted software downloaded from a network operator entity to a secure microprocessor resident on the server apparatus.

In yet another variant, the server apparatus further comprises: a first interface capable of at least receiving the content from a content-based network; a coaxial cable interface configured to provide networking throughout at least a portion of the premises over coaxial cable present therein; and a wireless access interface adapted to support at least one wireless network substantially within the premises. The content is accessible to users on both the coaxial cable network and the at least one wireless network.

In a third aspect of the invention, premises content rendering apparatus configured for data communication with a content providing device over a premises network is disclosed. In one embodiment, the rendering apparatus comprises: content rendering apparatus configured to render or cause rendering of digital content; authentication apparatus configured to facilitate authentication of the renderer apparatus with the providing device; and content selection apparatus adapted to browse and select at least one of a plurality of digital content associated with the providing device for transmission to the rendering apparatus.

In one variant, the rendering apparatus further comprises scanning apparatus, the scanning apparatus configured to locate one or more content servers on the network.

In another variant, the rendering apparatus further comprises a hardware and software adaptive data interface, the hardware adaptation allowing for the rendering apparatus to function to at least receive data when a wired communications link has been established between the rendering apparatus and the providing device, the software adaptation allowing for the rendering apparatus and the providing device to communicate without manual installation of a device driver. The transmission to the rendering apparatus is performed over the data interface. The interface can comprise, for example, a high-speed a high-speed serialized bus protocol capable of at least 800 Mbps data transfer rate, such as IEEE-1394.

In still another variant, the rendering apparatus further comprises a software security architecture adapted to protect at least portions of the digital content after it is transferred to the rendering apparatus. The content is encrypted before the transfer to the renderer apparatus, and the security architecture comprises at least one decryption algorithm and at least a portion of a public-private key pair used for decrypting the content.

In a fourth aspect of the invention, a method of sharing protected content within an ad hoc network is disclosed. In one embodiment, the method comprises: establishing ad hoc a communication channel between first and second entities, at least the first and second entities forming the network when the channel is established; authenticating at least one of: (i) the first entity to the second entity, or (ii) the second entity to the first entity; selectively allowing at least one of the first and second entities to browse protected content stored on the other of the entities based at least in part on the authenticating; and selectively transferring at least a portion of the protected content from at least one of the entities to the other of the entities based at least in part on: (i) the authenticating and (ii) a request for the at least portion of the protected content issued by one of the entities to the other.

In one variant, the act of establishing comprises causing the first and second entities to be placed in data communication via at least a plug-and-play data interface, the act of authenticating is performed by the same one of the entities performing the act of selectively allowing browsing, and the act of selectively transferring comprises transferring the at least portion of the content requested by the entity allowed to browse from the authenticating entity to the browsing entity over the data interface.

In another variant, the act of establishing comprises causing the first and second entities to be placed in data communication via a wireless interface wherein one of the first and second entities assumes a first role and the second entity assumes a second role with respect to the communication channel. The first role comprises a master station, and the second role comprises a slave station. Alternatively, the first role comprises an access point (AP), and the second role comprises a station (STA), the AP providing data connectivity to at least one other entity other than the STA.

In still another variant, at least one of the first and second entities is in data communication with a cable television network, and the act of authenticating is performed based at least in part on information obtained from the cable television network.

In a fifth aspect of the invention, a method of transfer of protected content between first and second media capable devices is disclosed. In one embodiment, the method comprises: causing at least one of the first and second devices to discover the other of the devices; determining security parameters associated with one of the devices; authenticating the one device with which the security parameters are associated; requesting via the authenticated device that the protected content be transferred; and transferring the protected content from the one of the first and second devices on which it is stored.

In one variant, the act of authenticating is performed substantially independent of an external authentication entity. In another variant, the first and second devices are in communication with a premises network, the premises network in communication with a cable television network, and the act of authenticating further comprises determining whether the device being authenticated can be granted access to the protected content based at least in part on a conditional access scheme.

In a sixth aspect of the invention, a multi-state content server device for use in a premises network is disclosed. In one embodiment, the server device comprises: a storage medium for storing protected content; a digital processor comprising at least one computer program configured for authenticating a content-requesting entity; and a state machine adapted to operate the server device in one or more of a plurality of states. The server device operates in a first state, and is configured to: receive a request for authentication from the content-requesting entity; and receive a request for delivery of content from the entity. The requests for authentication and for delivery of content not causing the server device to change from the first state to another state.

In one variant, the state machine comprises a virtual finite state machine (FSM). In another variant, the state machine comprises a deterministic state machine.

In a seventh aspect of the invention, a method of doing business over a content-based network is disclosed. In one embodiment, the method comprises: making commercially valuable protected content selectively available to at least one user of the network in exchange for consideration; permitting transfer of the content to a protected domain within a premises of the user; configuring the protected domain such that it can: authenticate a device communicating with the protected domain; determine the security capabilities of the device; and selectively transfer the protected content to the devices if (i) the device is authenticated, and (ii) the security capabilities are adequate to maintain protection of the content.

In an eighth aspect of the invention, a system for sharing protected digital content over a premises network is disclosed. In one embodiment, the system comprises at least a first device in communication with the network, the first device adapted to: receive the protected content over an interface to a cable television network; store the content on the first device; authenticate a second device in communication with the premises network when the second device requests access to the digital content from the first device; selectively provide access to the second device for browsing the stored digital content; receive a request for transmission of at least a portion of the content; and selectively transmit the at least portion of the content to the second device while maintaining the content protection.

In one variant, the first device comprises a substantially secure microprocessor having a plurality of security-related information stored therein, the information being received from the cable television network according to a downloadable conditional access protocol, at least a portion of the security-related information being used to perform the authentication of the second device.

In a ninth aspect, apparatus and method for extending the capabilities of the trusted or authorized service domains with a content based (e.g., cable television) network are disclosed.

In a tenth seventh aspect of the invention, a method of sharing protected digital content between two client premises devices associated with a premises network is disclosed. In one embodiment, the method comprises: storing protected digital content at a first of the two client premises devices; the first client premises device authenticating a second of the client premises devices requesting access to the protected digital content from the first client premises device, the authentication comprising determining rights of the second client premises device to access the protected digital content, and the first and second client premises devices thereby creating an authorized service domain (ASD) for maintaining protection of the protected digital content; selectively providing access to the second client premises device for browsing the digital content; receiving a request for transmission of at least a portion of the protected digital content; and the first client premises device selectively transmitting the at least portion of the protected digital content to the second client premises device while maintaining the content protection; wherein the selective transmission is conducted entirely between the two client premises devices, and is irrespective of any network entities outside the premises network.

In an eleventh aspect of the invention, a user premises apparatus configured as a content server for one or more devices over a user premises network is disclosed. In one embodiment, the user premises server apparatus comprises: storage apparatus configured to store a plurality of digital content; authentication apparatus configured to authenticate at least one device requesting content from the server apparatus; browsing apparatus configured to enable at least one requesting device to browse a directory of available ones of the plurality of content; and security apparatus configured to control access to the content by the browsing apparatus based at least in part on successful authentication of the at least one requesting device, the browsing apparatus and the at least one requesting device comprising an authorized service domain (ASD) for protection of the content.

In a twelfth aspect of the invention, a system for sharing protected digital content over a premises network is disclosed. In one embodiment, the system comprises at least a first device in communication with the premises network, the first device configured to: receive the protected content over an interface to a content delivery network; store the content on the first device; receive a query from a second device in communication with the premises network, the query requesting security framework capabilities of the first device; receive in response to an answer to the query, a request for access to the content from the second device; authenticate the second device when the second device requests access to the digital content from the first device, the authentication comprising verification that the second device is compatible with the security framework capabilities of the first device; create an authorized service domain (ASD) comprising the first and second devices, the ASD configured to maintain protection of the protected digital content; selectively provide access to the second device for browsing the stored digital content; receive a request for transmission of at least a portion of the content; and selectively transmit the at least portion of the content to the second device while maintaining the content protection.

In a thirteenth aspect of the invention, a method of providing a premises network configured to enable sharing of plurality of protected content between a plurality of devices associated with the premises network without requiring the plurality of devices to access a remote network agent is disclosed. In one embodiment, the method comprises: storing the plurality of protected content at a first of the plurality of devices; creating a directory of the plurality of protected content, the directory indicating at least a title for individual ones of the plurality of protected content; establishing an authorized service domain (ASD) for maintaining protection of the plurality of protected content, the plurality of devices communicating within the ASD via the premises network; authenticating a second of the plurality of devices to the first of the plurality of devices via the ASD to enable communication of content therebetween; selectively providing access to the second of the plurality of devices to the directory, the access enabling the second of the plurality of devices to browse the plurality of protected content stored at the first of the plurality of devices by at least the titles; and upon receipt of a selection of at least one of the plurality of protected content, transmitting the at least one of the plurality of protected content and digital copyright data relating thereto to the second of the plurality of devices; wherein the transmission of the at least one of the plurality of protected content and the digital copyright data relating thereto to the second of the plurality of devices is based at least in part on the authentication; and wherein the transmission of the at least one of the plurality of protected content occurs in an absence of intervention by entities outside the premises network.

In a fourteenth aspect of me invention, a first consumer device in communication with a premises network for sharing protected digital content over the premises network is disclosed. In one embodiment, the first device comprises: a first interface configured to receive the protected content from a content delivery network; a second interface configured to communicate with a second device in the premises network; a storage entity configured to store the protected content; a processor comprising at least one computer program configured to: receive from the second device a request for security framework capabilities of the first device; provide the security framework capabilities of the first device to the second device via the second interface; receive a request for access to the protected content from the second device; authenticate the second device as being within an authorized service domain (ASD); transmit a directory of the protected content stored at the first device to the second device for browsing thereof; receive a selection of an individual one of the protected content; and selectively transmit the individual one of the protected content to the second device while maintaining the content protection.

These and other aspects of the invention shall become apparent when considered in light of the disclosure provided herein.

DETAILED DESCRIPTION OF THE INVENTION

Figure 1:
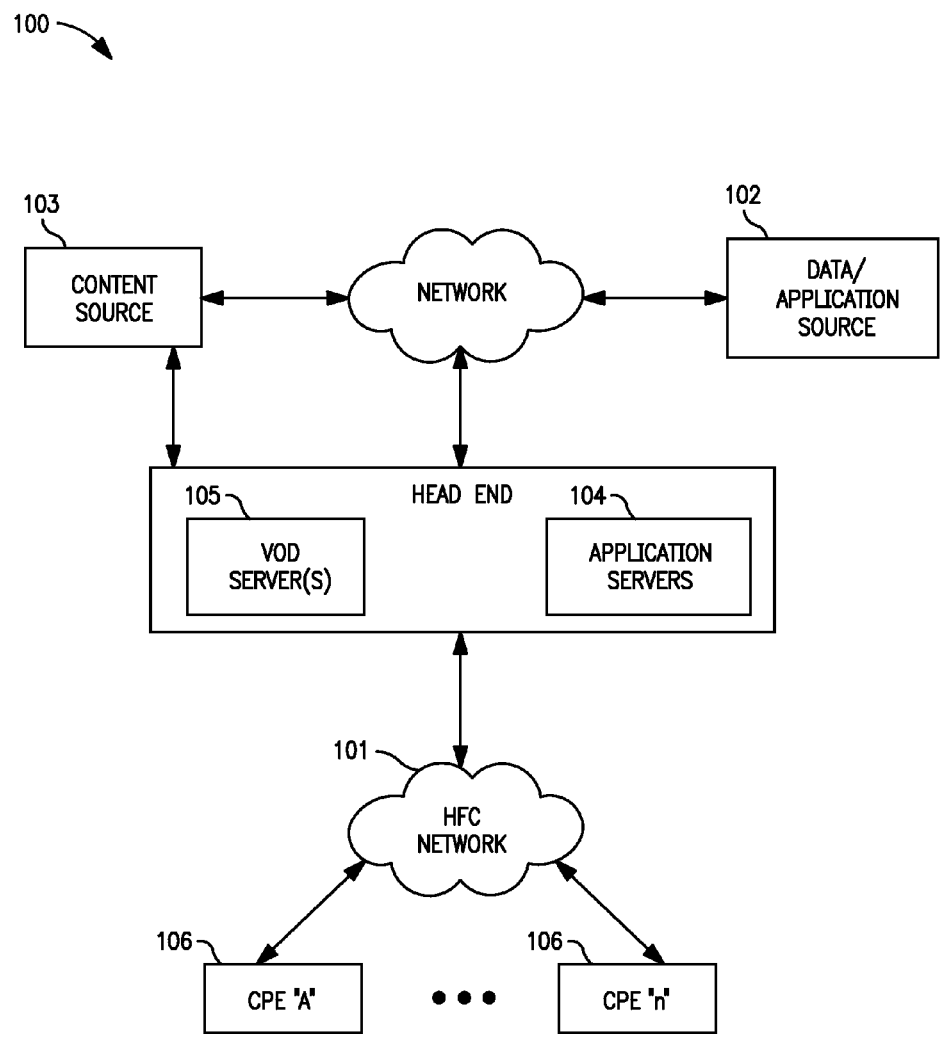
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, LG "Chocolate", and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.), Binary Runtime Environment (BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-04), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally and without limitation to a terminal device that has access to digital television content via a satellite, cable, or terrestrial network. The host device functionality may be integrated into a digital television (DTV) set. The term "customer premises equipment" (CPE) includes without limitation electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateways or gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR"(digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the terms "render" and "renderer" refer to any device, process or entity which utilizes content for, without limitation. display, execution, or playback. For example, a renderer might comprise a DVR, television monitor, PC, mobile device with display capability, laptop computer, iPod or even an MP3 player.

As used herein, the terms "security framework" and "security package" refer generally to, without limitation, one of more of implementation guidelines, security policies, application programming interfaces (APIs), encryption or scrambling algorithms, and cryptographic element (e.g., symmetric or asymmetric key) generation and management algorithms.

As used herein, the term "server" refers to any computerized component, system or entity regardless of form which is adapted to provide data, files, applications, content, or other services to one or more other devices or entities on a computer network.

As used herein, the terms "PnP" and "Plug and Play" refer generally to a capability wherein devices can communicate when first placed in communication according to a substantially known or standardized capability. Such communication is generally without requiring reconfiguration or manual installation of device drivers. One exemplary embodiment of such PnP capability is the Universal PnP (UPnP) technology set forth in "UPnP™ Device Architecture" Version 1.0, dated Jun. 8, 2000, incorporated herein by reference in its entirety.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/i/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides a mechanism for devices connected to a home network to exchange information, and ultimately share or transfer protected content (including for example audiovisual or multimedia content, applications or data) in a substantially "peer-to-peer" fashion and without resort to a central security server or other such entity. Authorized "browsing" of the content present on one device by another device is also provided.

In one exemplary embodiment, an application-level message exchange functionality is described; using this message exchange, the premises devices can advertise their security capabilities relating to, e.g., protected content, and query other devices for their security capabilities. This query can be performed, for example, by identifying security frameworks or security packages that a device is capable of handling. These frameworks or packages become critical in, inter alia, a heterogeneous security environment. For example, implementations of security frameworks from different vendors can be markedly different, and may or may not interoperate, such as where two different vendors use the same scrambling algorithms (e.g., Data Encryption Standard (DES), triple DES, AES, etc.) that cannot interoperate because the details of their key management are different.

Accordingly, in one aspect, the present invention discloses a security architecture and associated logic residing on two or more different client devices or domains, wherein security information (and ultimately protected content) can be exchanged without resort to a centralized facility such as a cable head-end process or entity. For example, in one embodiment, a "server" CPE and a "renderer" CPE are disposed within a premises network. Message exchanges between the sever and renderer identify and validate each entity and its security package or framework capabilities, as well as other capabilities that may be necessary to effect the exchange and use of the protected content, data or application (e.g., the presence of an appropriate codec, algorithm, network interface, etc.). These exchanges are all effectively automatic and transparent to the user, thereby making device location and identification, content/data/application exchange, and browsing seamless.

The message exchanges between the server and renderer CPE may follow the syntax and guidelines of industry-wide interoperability standards such as UPnP, and/or may be specific to a premises networking standard (e.g., Multimedia over Cable Alliance (MOCA) or Home Phone Line Network (HPNA) specifications, WiFi, Ethernet, and so forth). In this capacity, the protocol of the present invention is largely premises network- and interface-agnostic, thereby increasing its flexibility.

Advantageously, the present invention can be seamlessly implemented using existing security frameworks and constructs, such as the Authorized Service Domain (ASD) framework, thereby extending these frameworks with additional capabilities and services including local (e.g., premises network discovery, browsing, and content streaming or transfer). Security information transferred between entities may be passed via an existing in-band security protocol, or in another embodiment, requesting authentication and passing in only a HostID or comparable data.

Moreover, the exemplary embodiment of the invention is agnostic to the type of conditional access (CA) system used (e.g., DCAS, M-Card, CableCard, etc.), and can even be used with future CA implementations or paradigms.

The present invention can be distinguished from prior art peer-to-peer approaches in that, inter alia, it is conducted entirely between two or more entities that have been authenticated and are part of a trusted or authorized service domain, thereby assuring that the participants to any transaction (e.g., content browsing, streaming, or download) are authenticated and authorized to browse or receive the content. Moreover, exemplary embodiments of the invention are implemented according to an entirely dynamic (e.g., "plug and play") component interface paradigm, thereby obviating many networking protocols and related compatibility issues associated with peer-to-peer communication over the Internet or other such WANs.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Lastly, it will be recognized that while described primarily in the context of a consumer or enterprise premises having a prescribed geographic scope or boundaries, the invention is in no way limited to any such premises description. For example, a "premises" as used herein could refer to a psychologically proximate premises; e.g., a group of entities or locations that are not physically proximate, but rather logically proximate with respect to a user, such as that user's home, office, and car. Similarly, a "premises" could refer to psychologically proximate devices irrespective of their physical location (e.g., "my cellular phone", "my DVR", etc.), or even psychologically proximate users ("my girlfriend", "my mother", "my boss", etc.) again irrespective of their location.

Content Delivery Network

FIG. 1 illustrates a typical content-based network configuration with which the premises content distribution apparatus and methods of the present invention may be used. As will be described in greater detail subsequently herein, the premises content distribution apparatus and methods of the invention are advantageously both independent of and agnostic to the delivery mode for the content; hence, the following discussion regarding cable network architectures is purely illustrative of one of many possible delivery modalities for content. Moreover, the present invention is independent of the delivery paradigm used within the network to deliver the content (i.e., broadcast, session-based, etc.).

The various components of the exemplary content delivery network 100 include (i) one or more data and application origination points 102; (ii) one or more content sources 103; (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for clarity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application, or other application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network entity. Exemplary embodiments of the CPE of the invention are described subsequently herein with respect to FIGS. 3a and 3b. It may also include a premises or home local area network, as described subsequently herein with respect to FIG. 2.

Figure 1A:
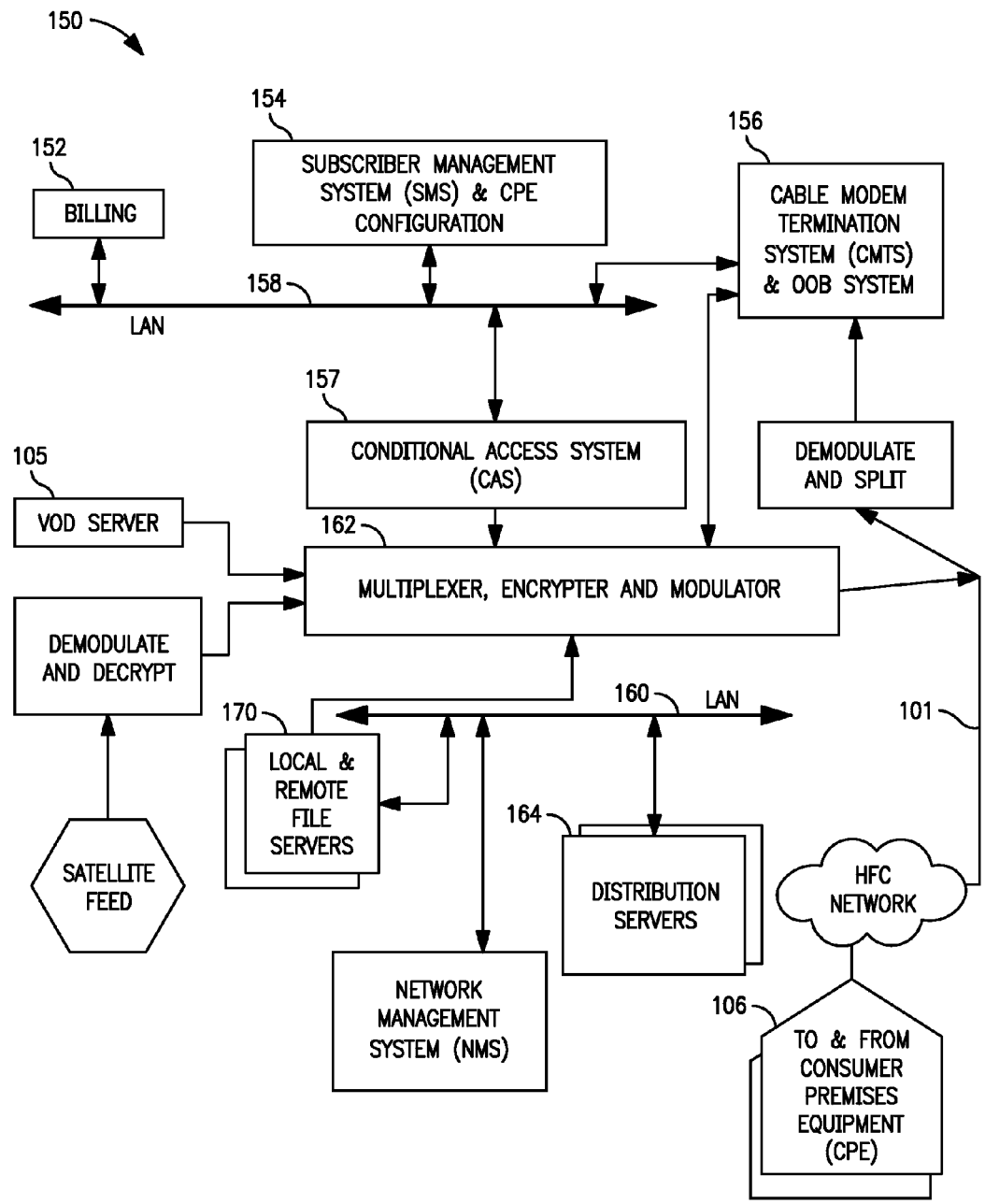
FIG. 1a is a functional block diagram illustrating one exemplary HFC cable network head-end configuration useful with the present invention.

Referring now to FIG. 1a, one exemplary embodiment of a network head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures (see, e.g., FIGS. 3e-3n and associated discussion presented subsequently herein).

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

A digital rights management (DRM) server, not shown, may also reside at the head-end 150, and used for serving DRM requests from downstream devices such as the CPE 106. The exemplary DRM server comprises a computer system where the security and encryption aspects of content transferred over the network 101 are managed. The content servers described above may implement encryption and CA technology in conjunction with the DRM server such that the content made available over the network can be received and decoded by specific CPE 106 only.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
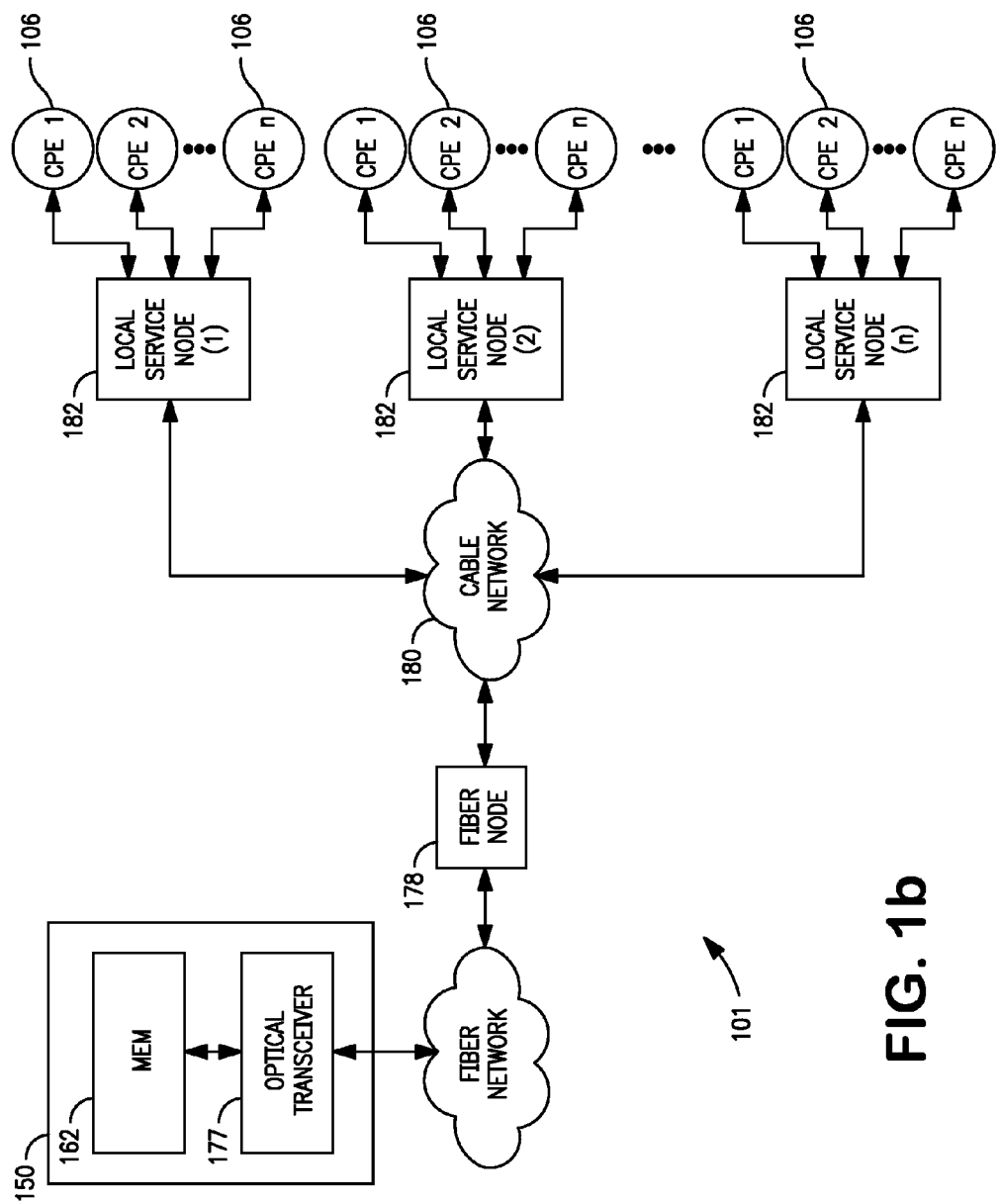
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
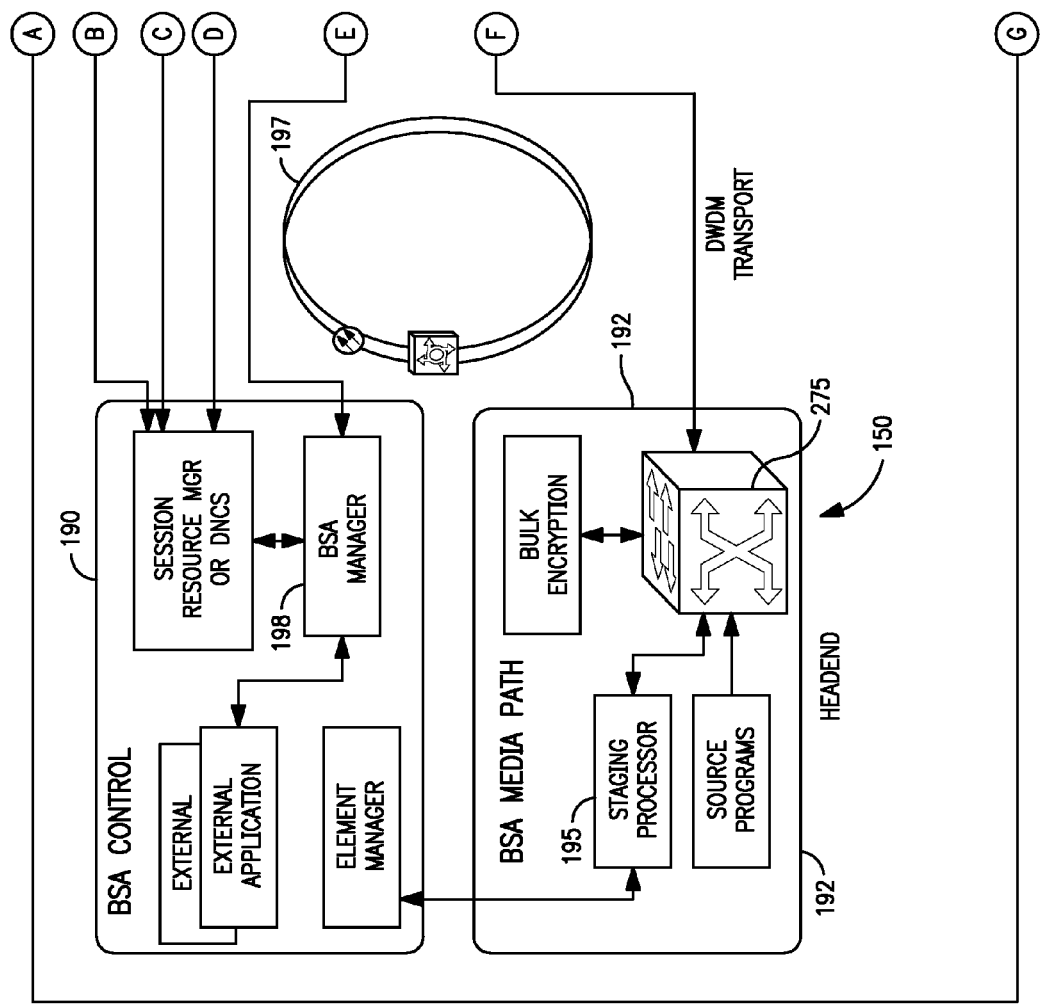
FIG. 1c is a functional block diagram illustrating one exemplary broadcast switched architecture (BSA) network useful with the present invention.
Figure 1C:
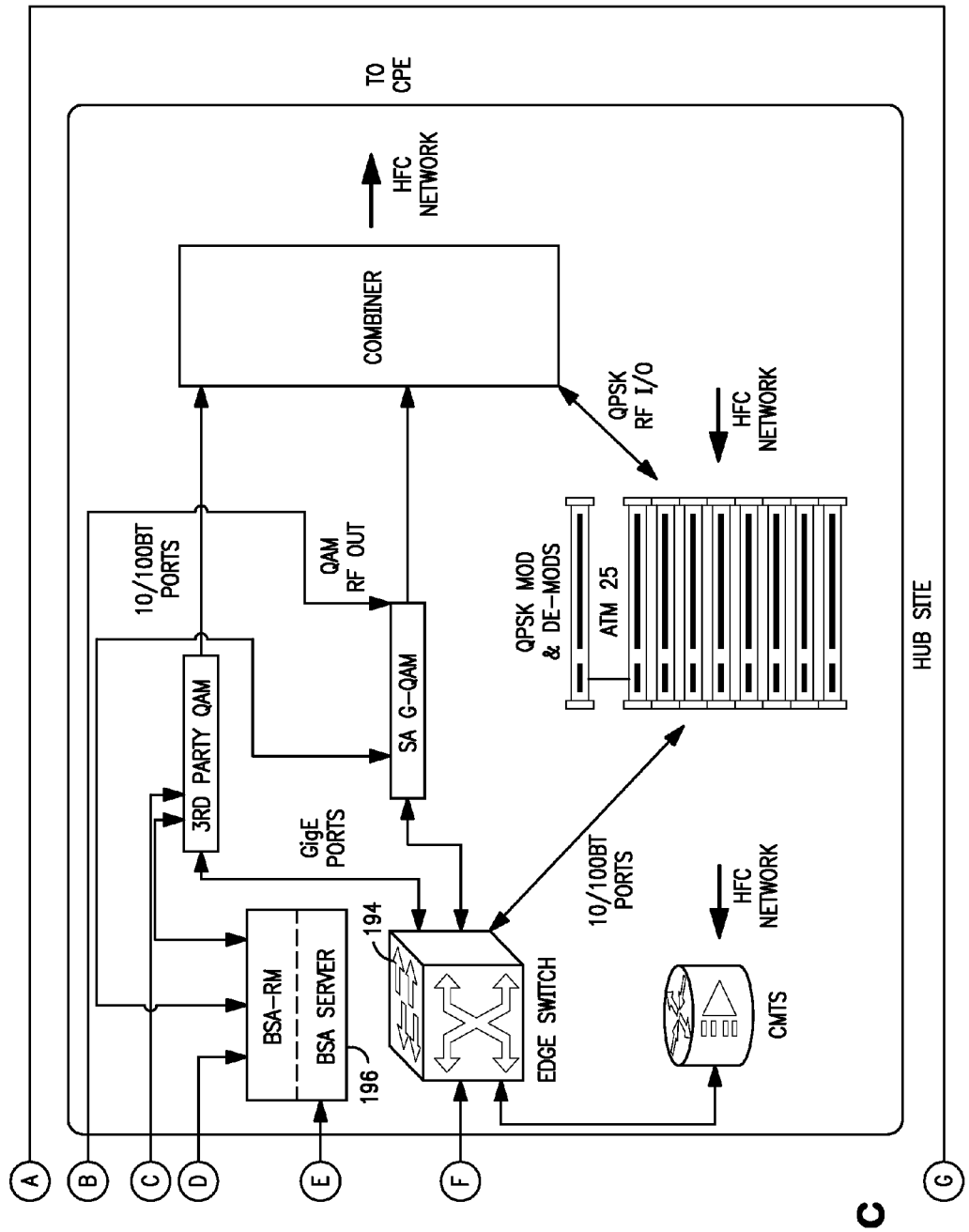

FIG. 1c illustrates an exemplary "switched" network architecture also useful with the premises content distribution architecture and methods of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device (e.g., converged device, as discussed subsequently herein) for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Co-pending and co-owned U.S. patent application Ser. No. 11/013,665 filed Dec. 15, 2004 and entitled "Method and Apparatus for High Bandwidth Data Transmission in Content-Based Networks", incorporated herein by reference in its entirety, describes yet another delivery model for the aforementioned content, based on a high-speed VOD-based infrastructure.

It will be appreciated that the content delivery network used with the premises distribution functions of the present invention may also include a downloadable conditional access (CA), DRM, or trusted domain (TD) apparatus such as those described in co-pending and co-owned U.S. patent application Ser. No. 11/584,208 filed Oct. 20, 2006 and entitled "Downloadable Security And Protection Methods And Apparatus", incorporated herein by reference in its entirety. Such download apparatus is useful at, inter a/ia, the head-end or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network. In one embodiment, these capabilities comprise downloadable personalized software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments referenced above allow for the download of secure software images, which may be used to, inter alia, ensure security of the downloaded images and also migrate protected content to other platforms in the user or client domain so as to extend the trusted or authorized service domain. Advantageously, outside of the conditional access system (CAS), the personalized software image is never rendered in an unprotected form or otherwise made accessible.

Premises Content Distribution System

Figure 2:
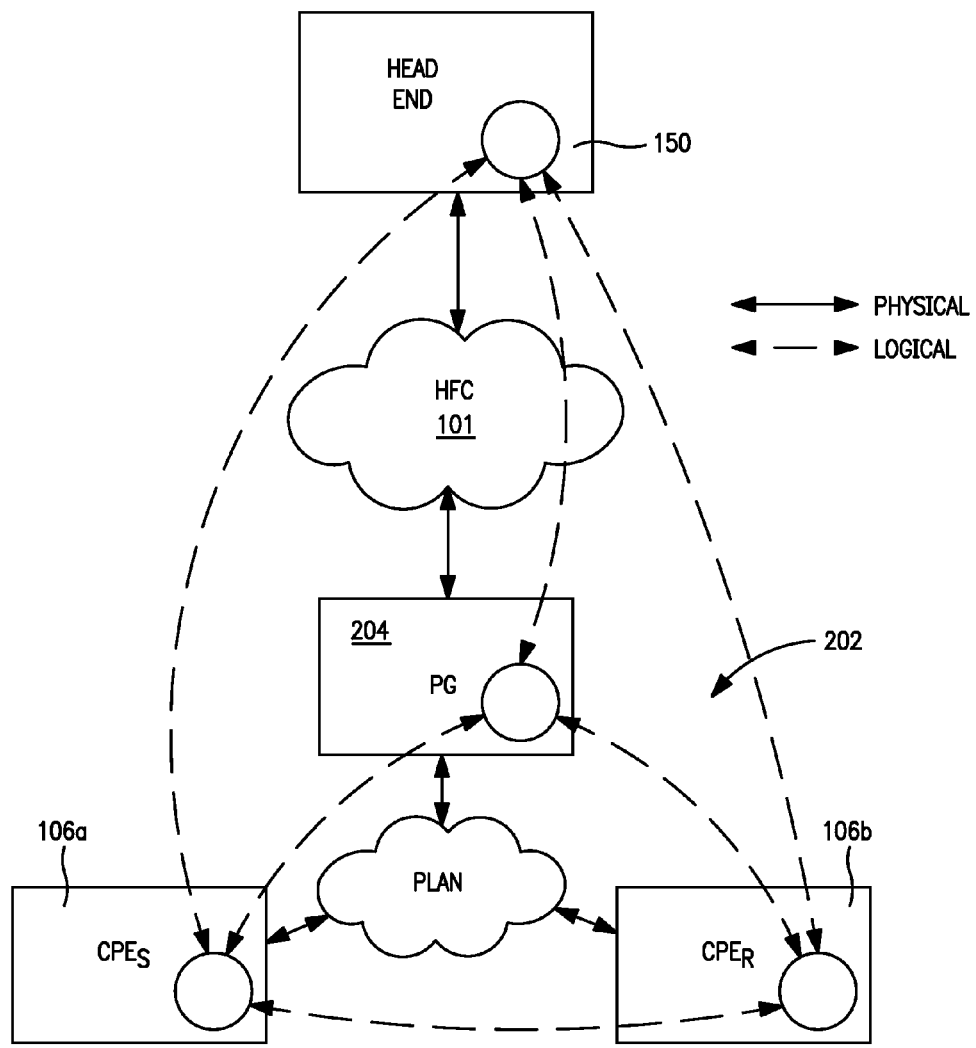
FIG. 2 is a graphical representation of a generalized security management architecture according to the invention, comprising trusted authority, operator network, and user domains.

Referring now to FIG. 2, an exemplary embodiment of a generalized premises content distribution apparatus according to the invention is described in detail. As shown in FIG. 2, the exemplary content distribution apparatus comprises a premises local area network (PLAN) 202 having a plurality of entities associated therewith. It will be appreciated that the PLAN of FIG. 2 is in no way tied to a particular topology or transport media, and in fact may be formed and modified ad hoc (e.g., ad hoc formation of WiFi AP/STA network, or Bluetooth Master/Slave bonding, or a PAN), and/or may comprise any number of different transport mechanisms. The PLAN 202 may also simply comprise two devices (e.g., server and renderer) in communication with one another.

The various components directly or indirectly communicating with the exemplary PLAN 202 include (i) one or more Premises Gateways (PGs) 204, (ii) one or more "server" consumer premises equipment (CPE) 106a functioning as a content source or server in the PLAN, and (iii) one or more "renderer" CPE 106b functioning as a renderer of content. It will be appreciated that a single device or entity may also switch roles (i.e., from server to renderer, or vice-versa), and may carry out both functions (i.e., server and renderer), albeit not necessarily for the same process or thread. Moreover, role switching can occur as part of the underlying transport or PHY functions (e.g., a WiFi AP/STA role switch, or Bluetooth Master/Slave role switch) while the server-renderer functions described herein are preserved.

A simple architecture comprising one of each of the aforementioned components is shown in FIG. 2 for clarity, although it will be recognized that comparable architectures with multiple components, as well as different network topologies, may be utilized consistent with the invention.

The PG 204 includes a hardware platform that is generally installed either inside or outside of the premises. The PG platform is connected to the bearer network (e.g., HFC 101, satellite network, Telco DSL network, etc.) via an appropriate interface such as a coaxial cable or DOCSIS connection, a digital subscriber line (DSL) telephony connection, an Internet Protocol Television (IPTV) connection over copper wire, a satellite receiver coupled to an antenna, etc. The PG is also connected on its back end to other equipment that is installed in the premises, via a PLAN interface. This PG/PLAN interface may take literally any form, whether wired or wireless, and in fact the functions of the PG and the PLAN may be integrated into one device if desired. For example, the PLAN might operate using the Ethernet (IEEE-Std. 802.3) protocol, and hence the interface might comprise a 10/100/1000/10-Gig-E NIC of the type well known in the art. Alternatively, the PLAN 202 might operate according to a wireless (e.g., WiFi) topology, and hence the PLAN interface would comprise a WiFi interface card. The PLAN might also utilize the indigenous premises coaxial cable as a transport medium, thereby necessitating a coaxial RF interface, and so forth.

In some implementations, the PG might function as the PLAN content "server" (described in greater detail below), or a proxy server that provides connectivity and address-ability to PLAN devices for the bearer network. A PG may also be connected to more than one bearer network, and/or may be connected to multiple PLANs, such as on different physical channels. For example, a PG may be connected to some in-home devices over a wireless connection and some other in-home devices over a wired connection such as a telephone line, power line, or indigenous coaxial cable.

The present invention accordingly contemplates various implementations of the premises gateway functionality. For example, one exemplary converged device useful with the present invention is described in co-owned and co-pending U.S. patent application Ser. No. 11/378,129 filed Mar. 16, 2006 and entitled "Methods and Apparatus for Centralized Content and Data Delivery", incorporated herein by reference in its entirety, although it will be recognized by those of ordinary skill that other devices and approaches may be substituted.

The PLAN content server 106a comprises a hardware/software platform in communication with the PLAN with control over access to stored content. The content can be stored using one or more storage media such as a hard drive (HDD), flash memory card or USB key, optical disc, memory array, RAID, etc. The storage may be present "in the box", or attached external to the server 106a over a dedicated or shared connection. In some deployments, the content server and the PG 204 may be implemented on the same physical platform. In such as case, the content server/PG might take the form of, e.g., a DVR or a multi-room DVR device that interfaces to one or more distribution networks 101, and one or more PLANs 202. It may also comprise one or more high-speed interfaces (e.g., USB 2.0, IEEE-Std. 1394 "Firewire", etc.) over which plug-and-play functionality may be implemented.

Similarly, the local server 106a may merely act as a proxy for an upstream device connected to multiple distribution networks. One such device is disclosed in a co-owned and co-pending U.S. patent application Ser. No. 11/440,490 filed May 24, 2006 and entitled "Personal Content Server Apparatus and Methods", incorporated herein by reference in its entirety. In one embodiment, the device comprises a personal content server located, e.g., at the head-end of the bearer (cable) network or at a BSA switching hub; this server distributes content to the remote requesting location(s), thereby eliminating repetitious traffic to and from subscriber's premises to fulfill the requests for remote content delivery.

It will be appreciated that the PLAN content distribution architecture of the present invention can also be used in a complementary or layered fashion with other content acquisition, management and control technologies. For example, the methods and apparatus described in co-pending and co-owned U.S. patent application Ser. No. 11/080,693 filed Mar. 14, 2005 entitled "Method And Apparatus For Network Content Downloading and Recording", incorporated herein by reference in its entirety, may be used consistent with the present invention to provide network users with the ability to purchase and record content to a physical medium, while also obeying the security policies imposed by the relevant security architecture (e.g., TD or ASD). This disclosure also provides mechanisms for the inclusion of digital copyright data within the recorded data/content, such as well-known digital watermarking data of the type authorized under the United States Digital Millennium Copyright Act (DMCA). For example, Digimarc®, SysCoP™, EIKONAmark ™, and other similar commercially available watermarking approaches can be used. Various types of steganographic approaches may also be employed consistent with the invention in order to enforce copyright and provide the copyright owner with accountability and/or trace-ability of reproduced versions of their copyrighted material. If desired, these approaches can be readily coded into the software or firmware of the recording device (which may be either the server or renderer) such that the inclusion of this data in content transferred between a server and renderer on the PLAN is completely transparent to the user, and does not require any user or MSO/content provider intervention.

Secure Content Transfer Methodology

Figure 2A:
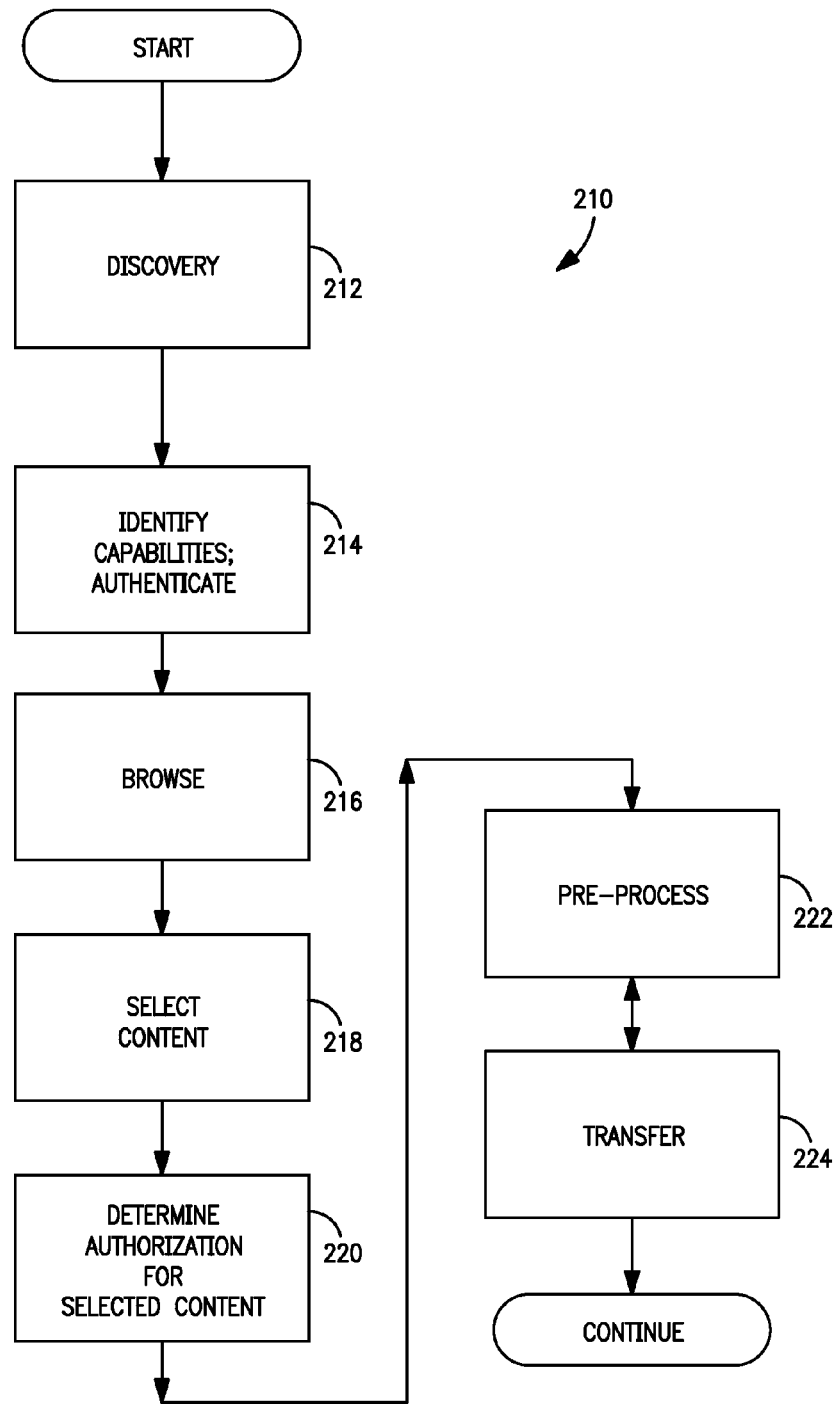
FIG. 2a is a logical flow diagram illustrating one exemplary embodiment of the methodology of secure content transfer within a premises network according to the invention.

Referring now to FIG. 2a, an exemplary embodiment of the generalized methodology of secure content transfer is described. As shown in FIG. 2a, the methodology 210 comprises first allowing one device to discover another device (step 212), or both devices to discover each other. As previously described, the two devices may form a client/server (e.g., renderer/server) relationship, although other relationships are possible. This discovery can occur via any number of approaches, including for example: (i) one device advertising its capabilities unsolicited onto the PLAN (e.g., a broadcast message); or (ii) response to a general or broadcast inquiry from the other device or its proxy.

A message exchange protocol is next used to identify security capabilities and requirements of one or both devices in order to authenticate (step 214). In a one-way authentication, the renderer can supply its information to the server, the latter which can selectively authenticate or not authenticate the renderer. The renderer conducts no authentication of the server. This approach is highly streamlined, but also provides no protection against a server spoofing, man-in-the-middle or other type of surreptitious attack intended to solicit information from the requesting renderer. Alternatively, a two-way authentication requires each device (server and renderer) to authenticate each other, thereby assuring that both devices are authentic.

Messages sent between the devices can be used to identify compatible security packages that each device possesses; e.g., AES or DES algorithms, public/private key pairs, support for certain security protocols, etc.

Once authentication and security capability determination is complete, browsing of one device by the other (e.g., browsing of the server's content by the renderer), or each device of the other, is performed (step 216). This browsing may include review of titles, and optionally other associated information (e.g., DRM or copyright requirements, file creation date, size, codec format, etc.). Such browsing functions may also allow for preview of the content by the requesting device, such as via a short pre-stored "trailer" or sample of the content, or simply accessing the content file itself for a limited duration of time. Various preview technologies known to those of ordinary skill in the art may be used consistent with the invention.

The selecting device (e.g., renderer) then indicates the choice of a particular content element (e.g., movie, MP3 file, etc.) title for viewing per step 218.

Once this selection is communicated to the server device, the server then determines the requesting device's authorization to receive the selected content (step 220), which may not necessarily coincide with the requesting device's permissions to browse or preview content. For example, a content owner or MSO might restrict unlimited or full access to content to certain selected populations of prospective users (e.g., Time Warner Cable subscribers), whereas a larger subset of potential users of the PLAN 202 can browse and preview, without having full access. This access differentiation can be used as the basis of a business model; i.e., enticing prospective subscribers or one-time purchasers by providing unlimited "teasers" or previews.

If full access to the content is allowed, the selected content is formatted (if required); e.g., compressed, recoded, decrypted, etc. per step 222, and then transferred over the designated communication channel from the serving device to the requesting device (step 224).

Figure 2B:
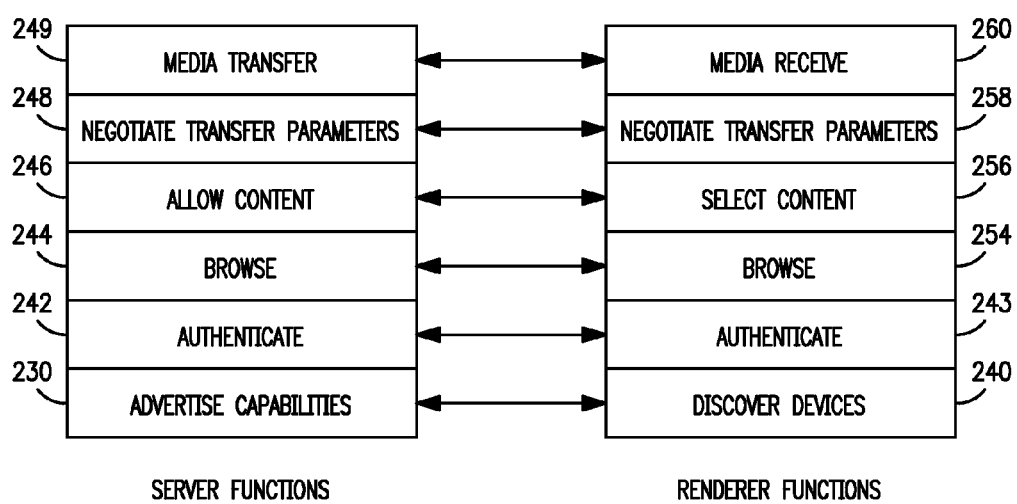
FIG. 2b is an illustration of exemplary detection, authentication, browsing, content selection, and transfer tasks performed by a renderer and a server implementation according to one embodiment of the invention.

Referring now to FIG. 2b, an exemplary message exchange between a server CPE and a renderer CPE is described according to one embodiment of the method of FIG. 2a. As shown in FIG. 2b, messages are first exchanged between "Advertise Capabilities" function 230 of the server and "Discover Devices" function 240 of the renderer CPE. Once this message exchange is completed successfully, the Authenticate function 242 of the server CPE and the Authenticate function 243 of the renderer CPE exchange messages to identify compatible security packages that each device can work with. Once this step is completed successfully, the Browse Control function 244 on the server will allow the Browse function 254 of the renderer to browse through secure content titles that can be made available to the renderer. Once the renderer indicates the choice of a particular title for viewing, the Content Selection functions 246, 256 enforces DRM constraints, and decides whether viewing of the content as requested by the renderer is allowed or not. If the viewing is allowed, the Transfer Parameter negotiation functions 248 of the server and 258 of the renderer may choose appropriate transmission parameters such as the transport protocol (e.g., TCP), user datagram protocol (UDP), port identification, packet rate of transmission, payload length, etc. Once this negotiation is completed, the media transfer function 249 of the server will then transfer the secure content to the media receiver 260 on the renderer.

Figure 2C:
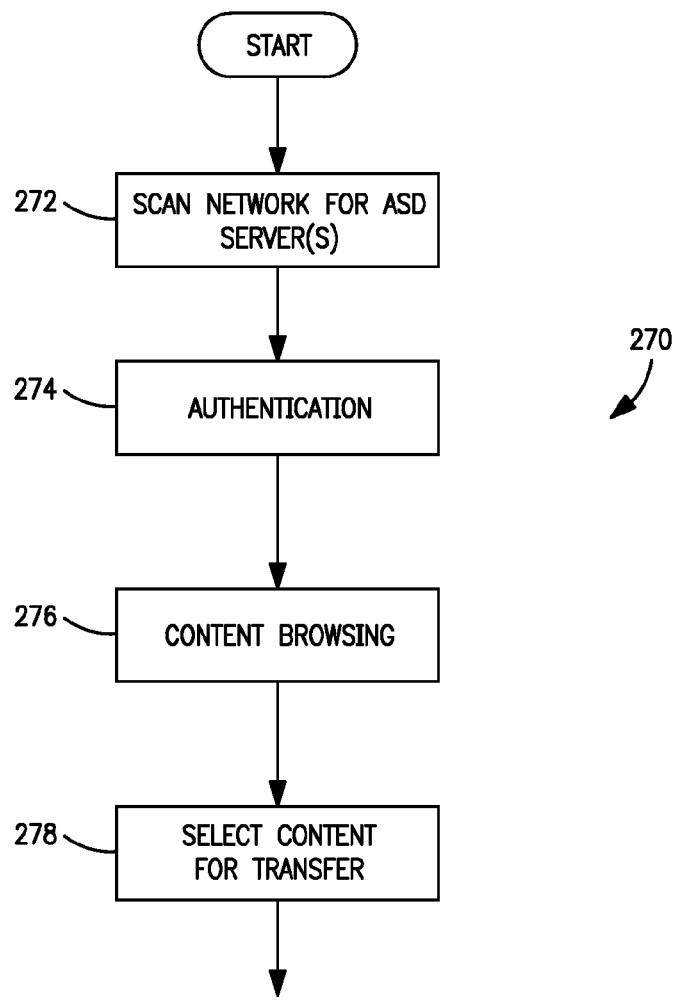
FIG. 2c is a logical flow diagram of exemplary functions implemented by a renderer device according to an embodiment of the present invention.

FIG. 2c illustrates one exemplary embodiment of the method 270 of operation of a renderer CPE 106b on the PLAN 202.

Generally speaking, before a renderer CPE can browse and request secure content from another device, the renderer CPE should know which devices implement the security framework (e.g., Trusted Domain or Authorized Service Domain). A renderer CPE can make such a determination by using any of a number of different techniques. For example, the renderer CPE may have a priori knowledge regarding identity of other CPEs that implement the prescribed security framework. Such knowledge can be programmed into the renderer CPE via "offline" techniques such as factory programming, or providing device identification from a network agent or input by user input. A renderer CPE can also gather this information by performing an "online" technique, such as searching the network for devices that respond and report the requisite security framework.

As shown in FIG. 2c, a renderer may scan the PLAN 202 (or multiple PLANs) to which it is connected looking for server CPE 106a that implement the desired security framework (step 272). Once the renderer locates a server that implements this framework, it authenticates itself with the server (step 274). In some implementations, the renderer may achieve the authentication by unicast message exchanges with each server device in the network. In other implementations, the renderer may be able to use multicast or broadcast messaging technique to perform the authentication with multiple servers in the PLAN. Note that the authentication step 274 of FIG. 2a may be performed without any user input to the renderer CPE 106b, or alternatively may require user input in the form of password, insertion of a security device such as an authentication card or dongle in the renderer, communication with a wireless identification device, etc.

Once the renderer 106b is authenticated with a server, a user can browse secure content (step 276) available on the server by using the renderer CPE or another control device to navigate through the titles. When a user picks a particular title for viewing, the renderer performs the content selection (step 278) to request viewing of the selected title from the server. Upon successful completion of this step, the server will provide the requested content to the renderer CPE, which in turn present the content to the user.

Figure 2D:
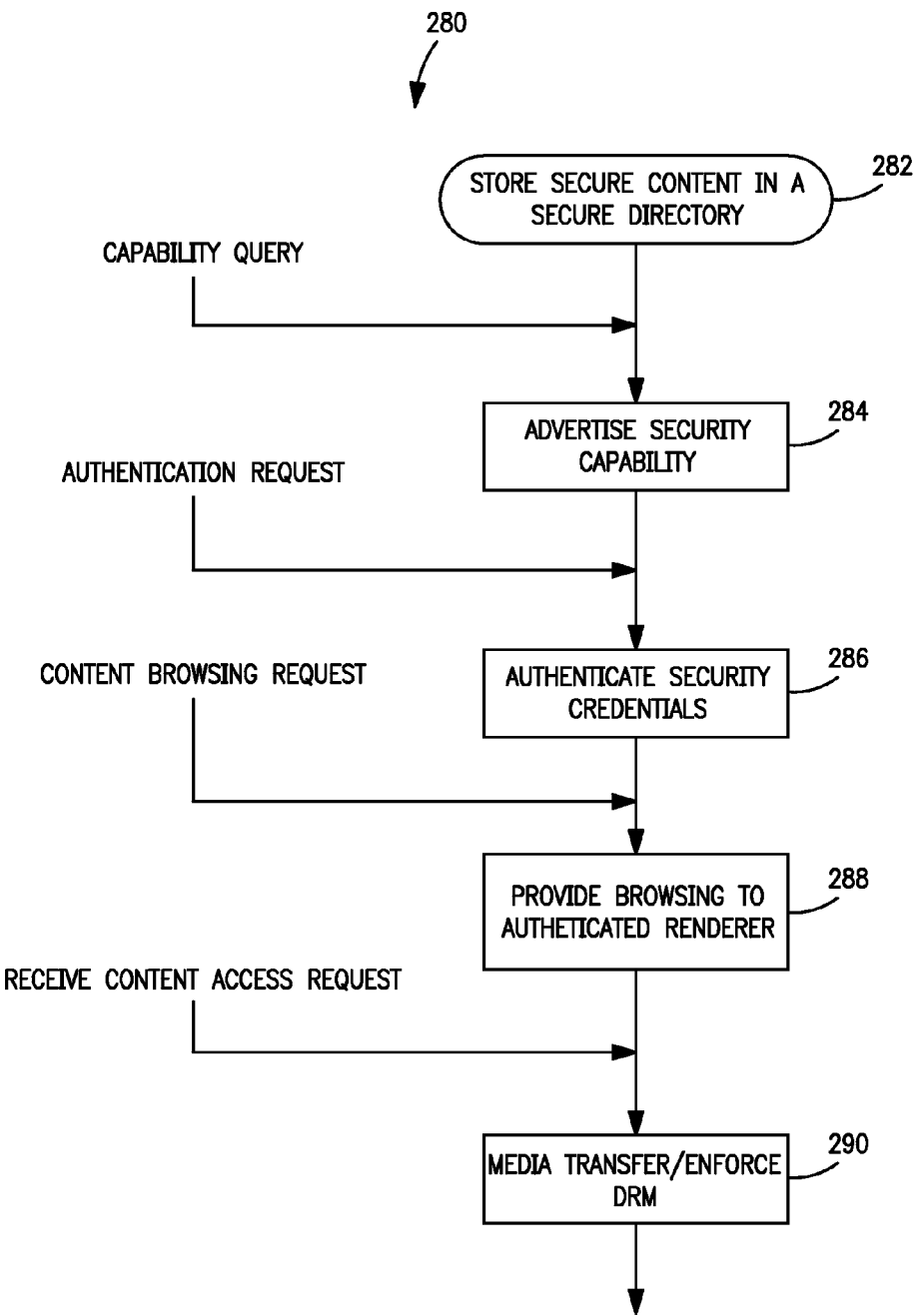
FIG. 2d is a logical flow diagram of exemplary functions implemented by a server device according to an embodiment of the present invention.

FIG. 2d illustrates one exemplary embodiment of the method 280 of operation of a server CPE 106a on the PLAN 202.

The server 106a first stores secure content using a security mechanism, such that the content and directory listing are available only to authenticated requests (step 282). The content may or may not be encrypted or otherwise protected when stored on the server CPE.

When the server receives a capability query from another device on the network, it advertises its own security framework capabilities to the requesting device (step 284). In some implementations, the server CPE may be configured to support more than one vendor's security frameworks. Similarly, in other implementations, the server may be able to support different security frameworks on different PLANs to which it is connected. For example, a server CPE 106a may support one vendor's security framework on an in-home coaxial cable PLAN, while also supporting another vendor's security framework on a residential phone line (HPN) or HomePlug network.

The server sends out a message per step that contains sufficient details to allow the requesting device to make determination about whether it can interoperate with the security framework implemented on the server device. The requesting device will typically respond to the security framework capability advertisement by requesting authentication from the server device. When the server receives the authentication request, it will verify security framework (e.g., TD or ASD) credentials presented by the renderer device and respond (step 286). Credential verification may comprise, for example, connection to a head-end or third-party entity (e.g., via DOCSIS or other channel) such as a controller or DAC.DNCS device, as well as verification via a home account; These credentials may also be cached onto a local or remote server if desired, even to include a server disposed at a hub site or node other than the head-end.

When the credentials are verified, the server CPE can service a content browsing request from a renderer (step 288). When the server receives this request, it verifies that it has previously authorized (step 286) the device requesting access to the TD or ASD directory. The server will reject the browsing request if the requesting device is not previously authorized by, e.g., sending an appropriate message to that device.

In some implementations, the server 106a may put limits on a renderer's ability to browse content on the server. For example, the server may authenticate and grant the renderer the ability to browse secure content for a fixed time window, after which the renderer must re-authenticate itself. In another implementation, the server may require the renderer to re-authenticate itself when changing content directories or genres or parental ratings of the content, reestablishing a physical layer or logical connection, etc. The server enforces DRM rules per step 290 against a renderer device that has been previously authorized (in step 286), and has previously browsed content in a TD or ASD directory (step 288). The DRM rules enforced by the server include rules regarding whether the client has access authorization, whether the client has copy protection authorization, and so on.

Figure 3A:
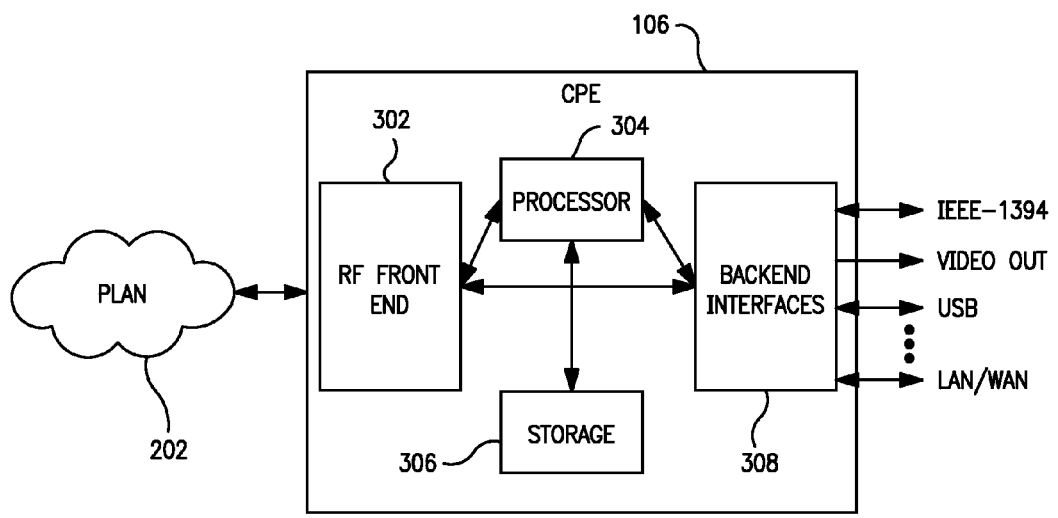
FIG. 3a is a functional block diagram of an exemplary embodiment of a consumer premises or client device implementing the server and/or renderer functions of the present invention.
Figure 3B:
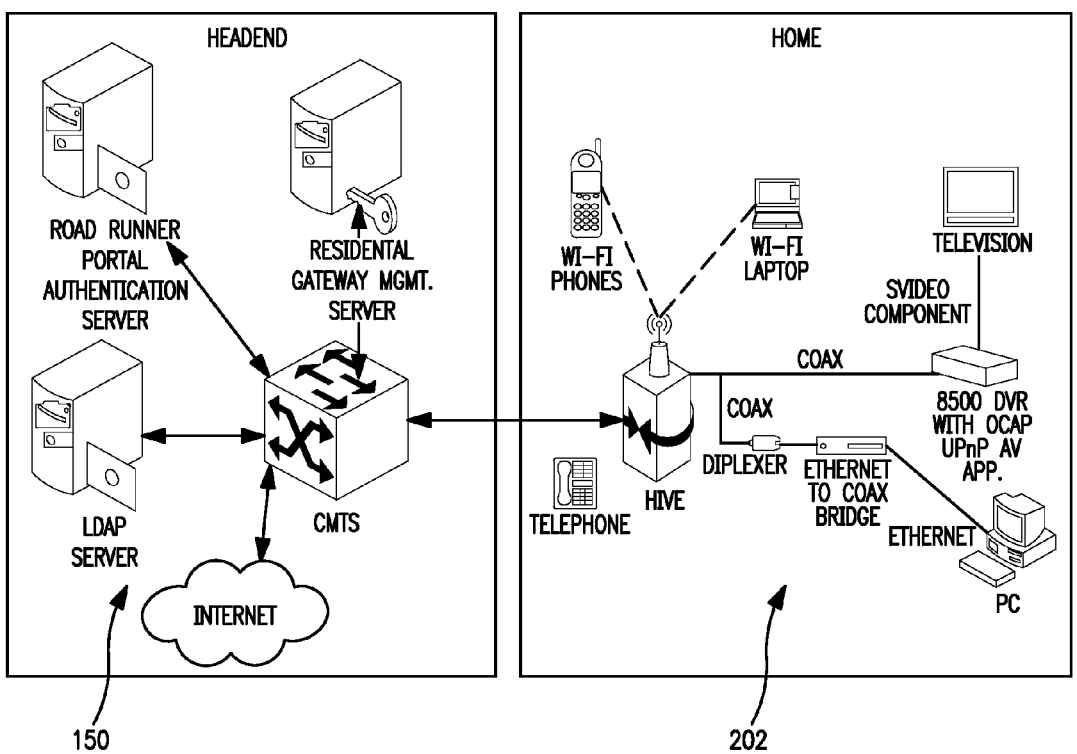
FIG. 3b is a functional block diagram of an exemplary converged premises device according to another embodiment of the invention.

Security information transferred between entities may be passed via an existing in-band security protocol, or in another embodiment, requesting authentication and passing in only a HT ID CPE Architecture Referring now to FIG. 3a, one exemplary embodiment of a server or renderer CPE 106a, 106b according to the present invention is described. As previously noted, server or render CPE can be identical, and even perform both functions (i.e., serving content and rendering content at different times, or at the same time for different processes/threads).

As shown in the simplified diagram of FIG. 3a, the device 106 generally comprises a computerized system (e.g., embedded DSTB, converged premises device, etc.) having an RF front end 302 for interface with the delivery network 101 (or any interposed gateway devices) of FIG. 2, digital processor(s) 304, storage device 306, and a plurality of interfaces 308 (e.g., video/audio interfaces, IEEE-1394 "Firewire", USB, serial/parallel ports, etc.) for interface with other end-user apparatus such as televisions, personal electronics, computers, WiFi or other network hubs/routers, etc.

Other components which may be utilized within the device (deleted from FIG. 3a for simplicity) include various processing layers (e.g., DOCSIS MAC or DAVIC OOB channel, MPEG, etc.) as well as media processors and other specialized SoC or ASIC devices. A separate cable modem (e.g., DOCSIS) tuner may also be included for receiving downstream cable modem signals over the coaxial cable. The CPE 106a may also comprise an integrated HD decoder, thereby relieving any connected monitors or other devices from the requirement of having such a decoder. These additional components and functionality are well known to those of ordinary skill in the cable and embedded system fields, and accordingly not described further herein.

Alternatively, the CPE 106 may comprise a "head-less" configuration, wherein the only user interaction with the device occurs over a network connection; e.g., in a PVR-like fashion.

The CPE 106 of FIG. 3a can also be provided with an OCAP-compliant application and Java-based middleware which, inter alia, manages the operation of the device and applications running thereon. It will be recognized by those of ordinary skill that myriad different device and software architectures may be used consistent with the tuning and channel request functions of the present invention, the device of FIG.

3a being merely exemplary. For example, different middlewares (e.g., MHP, ARIB, ACAP or proprietary) may be used in place of the OCAP middleware of the illustrated embodiment.

The CPE 106 may further contain application layer programs that allow interactivity with other devices on the network. Examples of such programs include UPNP application, a program guide, and so on. The renderer CPE may be implemented such that a user can control the renderer "directly" or "over the network." The direct control to a user may be in the form of a remote control, control switches and buttons (e.g., volume control knob). When the renderer CPE is controlled "over the network", a user may be able to configure the device by accessing its controls via a network connection, such as via a remote or local PC, etc. While in some implementations, one network may used for accessing the device for controlling purpose and another network may be used for content transfer, typically the same network (PLAN) will be used to achieve both the tasks.

The exemplary CPE 106 further comprises a personal media application, which allows a user to manage his personal media tasks. Such management includes, but is not limited to, the ability to browse through programs stored locally or on a server to see which programs are available for viewing. Previewing and similar extended "browsing" functionality may also be provided. In the virtual PVR or network PVR scenarios described elsewhere herein, such programming or content may be stored on a server located at the head-end, with the server CPE 106a acting effectively as its proxy. The personal media application may also be made responsive to a network-side application that queries the CPE to check on the program titles stored on the CPE 106.

As previously noted, either of the CPE 106a, 106b of the invention may be embodied as a multi-function or converged premises device, such as that described in co-owned and co-pending U.S. patent application Ser. No. 11/378,129 filed Mar. 16, 2006 previously incorporated herein. This exemplary configuration (FIG. 3b) comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or WiFi architectures may also be provided via the device; these services can make use of the network operator's indigenous VoIP or comparable telephony capability if desired, thereby providing an even more unified service environment. The converged premises device can also provide a trusted domain for content or data, as well as allowing a subscriber mobility in the home by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This will allow existing devices and DVRs to connect and share content with the CPE, and also allows the network operator (e.g., MSO) to control and manage the premises coaxial network.

The CPE is also advantageously accessible via any remote device with internetworking (e.g., Internet) capability, thereby allowing personal content to be accessed by the user from outside the premises.

It will be appreciated that the CPE 106 (e.g., the converged device previously described) may also have and maintain its own security credentials, which permit it to interact with the TD/ASD.

Moreover, the CPE 106 may comprise a PMD having its own indigenous security credentials.

Scanning and Authentication

Figure 4:
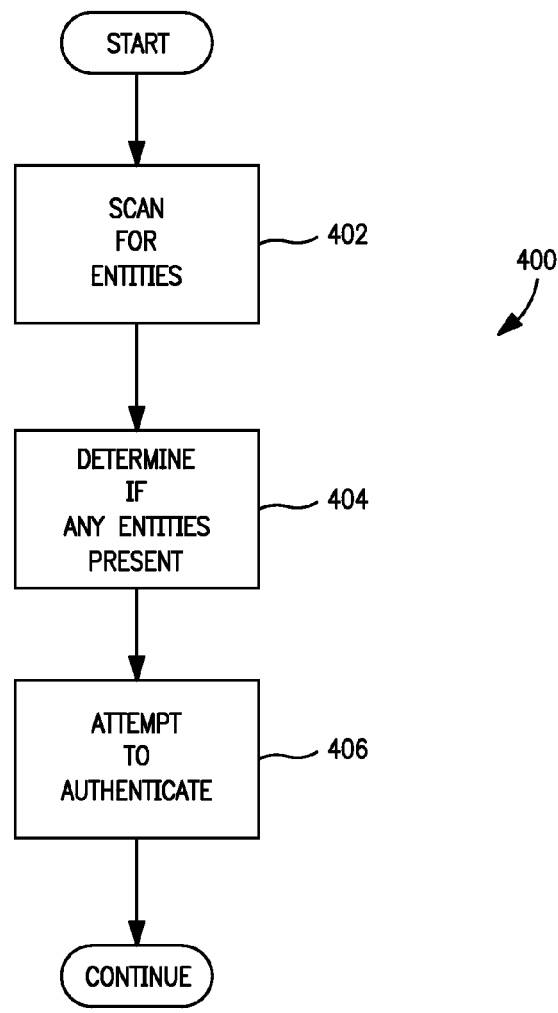
FIG. 4 is a logical flow diagram illustrating an exemplary generalized methodology for location and authentication of devices on a network (e.g., PLAN).
Figure 4A:
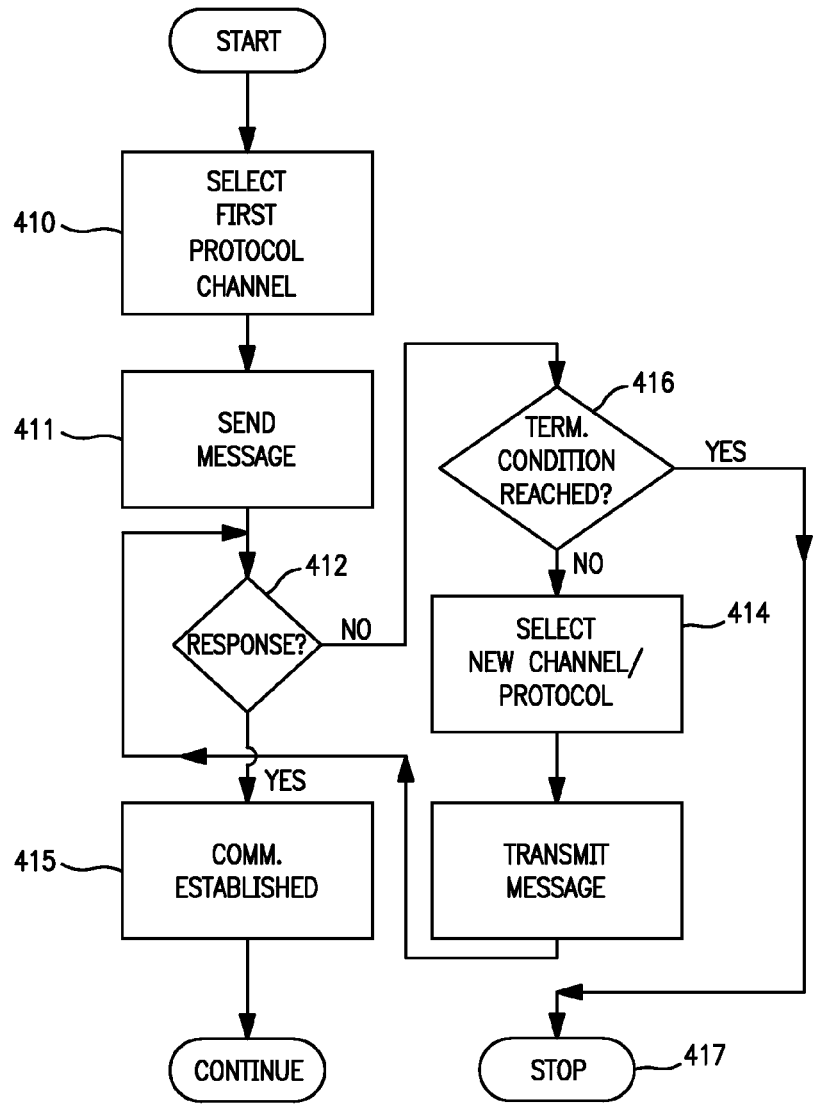
FIG. 4a is a logical flow diagram illustrating an exemplary methodology for scanning a network (e.g., PLAN) according to the invention.
Figure 4B:
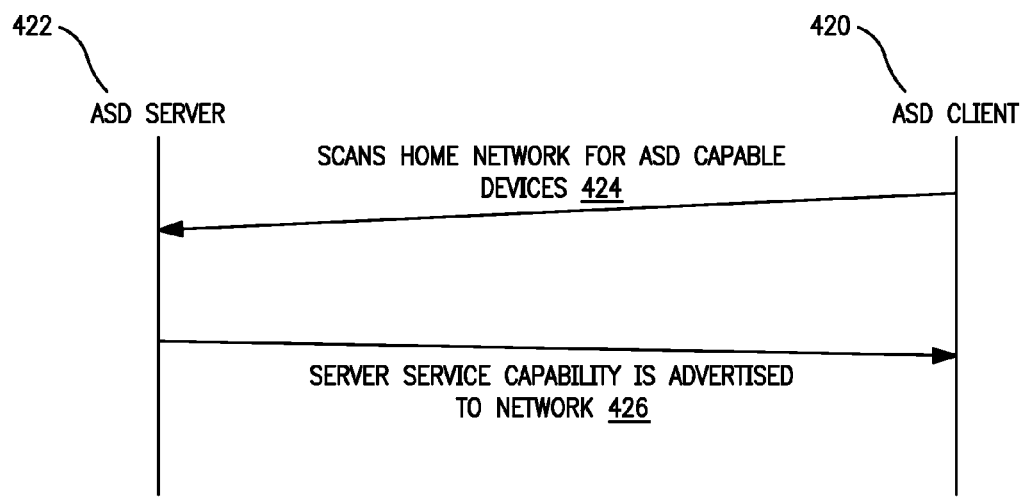
FIG. 4b is a graphical illustration of an exemplary embodiment of an ASD message exchange sequence between a client or renderer process and server process during the network scan.

Referring now to FIGS. 4-4b, methodologies for locating and authenticating trusted devices on the PLAN 202 are described.

As shown in FIG. 4, the generalized methodology 400 comprises a first entity scanning the network for other entities (step 402). This may be accomplished by, e.g., sending a unicast or multicast (e.g., broadcast) message; monitoring the physical medium for indications of other entities (e.g., CSMA/CD signals, etc.), or yet other techniques. The first and other entities may comprise either the server or renderer CPE 106a, 106b previously described herein, or merely just two or more entities on the PLAN (not necessarily acting as either a server or renderer, such a where the entity is acting as a network proxy for the server or renderer, or merely an intermediary node such as a gateway or router).

Per step 404, the scanning entity determines whether any other entities are present based on its actions of step 402, and if so, next attempts to contact one or more of the detected entities in order to authenticate itself and request services (step 406).

FIG. 4a illustrates one exemplary embodiment of the scanning process (step 402) of FIG. 4. As shown in FIG. 4a, the exemplary scanning procedure comprises first selecting a message protocol to locate or contact one or more other entities (step 410). The process of selecting a message protocol may also be predetermined; i.e., the initial protocol is determined in advance, or may be dictated by some other action or condition existing on the PLAN 202 or within the sending device.

Next, the first or contacting entity issues a communication (e.g., message) to the other (receiving) entity or entities to determine (i) the existence of the other entity; and/or (ii) the protocol or communication capabilities of the other entity (step 411).

Depending on whether the communicating entity receives a response to its communication or not (step 412), it can then optionally invoke other communication modes or channels if available to attempt to contact the other entity (step 414) and receive a response. If successful, the method will continue, wherein the communicating entity then attempts to authenticate itself to the responding entity (step 406 of FIG. 4). If not, the communicating entity will iterate or try additional channels until either communication is established (step 415) or a timeout/failure condition is reached (such as having no additional channels) per step 416, at which point the. process terminates (step 417).

FIG. 4b shows an exemplary embodiment of a message exchange sequence between a client or renderer process 420 (e.g., residing on the renderer CPE 106b) and a server process 422 (e.g., residing on a server CPE 106a) during the scan (step 402) according to the method of FIG. 4. While described in the context of the exemplary ASD previously discussed, it will be recognized that the following exemplary service and protocols are in no way so limited, and may be applied to other types of trusted domains, and even other types of security architectures in general.

As shown in FIG. 4b, the ASD-enabled client/renderer 420 sends a message 424 to the other devices on the PLAN 202 to find out if any other ASD-capable devices are present on the PLAN. This message may either comprise e.g., a proprietary format, or alternatively an industry-standard format. If the ASD renderer 420 uses a proprietary format, it may be disadvantaged from the perspective that only devices recognizing that particular proprietary format will be able to meaningfully respond to the query. Alternatively, the use of an industry-standard messaging mechanism ensures interoperability with different vendor's products. The aforementioned UPnP is one such example of a messaging protocol.

If the ASD client implements the UPnP device capabilities discovery messages, it can interoperate with a large number of different vendor's products that implement the UPnP messaging protocol. Furthermore, because this protocol is an application layer protocol, the same message can be used over different PLANs such as wireless (e.g., WiFi or WiMAX), MoCA, HPNA, HomePlug, and so forth, which may or may not be in communication with another.

An ASD-server 422 responds to the client query 424 by a message 426 indicating its server capability (and/or other functionality, such as device profiling for storage capacity, supported communication modes, etc.). The ASD server may send this message unicast to the querying renderer device, or may multicast (including broadcast) this response so that one or more other devices on the PLAN can utilize it.

It will be appreciated that the server may also initiate the foregoing process; e.g. where the server process broadcasts its presence and/or capabilities onto the PLAN unsolicited, or in response to other events aside from receiving a renderer-based scan or query.

Figure 4C:
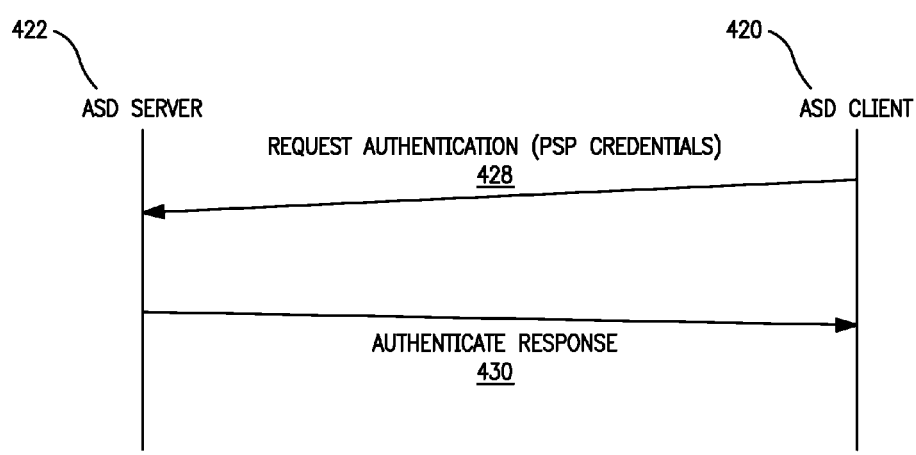
FIG. 4c is a graphical illustration of an exemplary embodiment of an ASD message exchange sequence between a client or renderer process and server process during authentication.

FIG. 4c shows an exemplary embodiment of a message exchange sequence between an ASD client or renderer process 420 and an ASD server process 422, initiated by the renderer in order to be authenticated by the server process 422 (step 406 of FIG. 4). To obtain authentication, the renderer process 420 sends a RequestAuthentication message 428 to the server 422. The RequestAuthentication action provides a mechanism for a renderer to submit its ASD credentials to the server 422 so that the server can verify it against the trusted device list.

Note that the renderer device may be prompted to send the RequestAuthentication message by an action of the server 422 (e.g., receiving a probe, content advertising, or other message from the server, or receiving a message (e.g., primitive) from a higher layer or related process within the client device itself (such as in response to a user action or request).

Table 1 shows an the protocol fields included in an exemplary embodiment of the RequestAuthentication message. The first column of Table I ("Argument") lists various protocol fields used in the message. The second column of Table I ("Direction") indicates whether the corresponding field in the first column is filled in by the requesting client device or by the server device. A requesting client supplies the fields called out as "IN" for example. The third column ("Related State Variable") gives an example of how a host that receives the RequestAuthentication message can record the fields by using a state variable within in the host's implementation. The exemplary ASD identifier (ASDID) is a sufficiently unique identifier associated with the requesting client device. When an ASD host receives the ASDID, it can "remember" it by updating a state variable (ClientASDID).

Other protocol fields included in the exemplary message format include: (i) the ASDPEK field, which contains the password encryption key (PEK) used by the client device; (ii) the ASDPSK field, which contains the pre-shared key (PSK) for the ASD services; (iii) the HostID field, which contains sufficiently unique identification of the host device to which the message is being sent; (iv) the HostPEK field, which contains the PEK that is specific to the device issuing the request message (the HostPEK is the password encryption key of the requesting device); (v) the HostPSK, which is the PSK of the requesting device.

TABLE 1

| Argument | Direction | Related State Variable |
|---|---|---|
| ASDID | IN | ClientASDID |
| ASDPEK | IN | ClientASDPEK |
| ASDPSK | IN | ClientASDPSK |
| HostID | IN | ClientHostID |
| HostPEK | IN | ClientHostPEK |
| HostPSK | IN | ClientHostPSK |

If the ASD server process 422 is able to authenticate the ASD client process 420 based on the RequestAuthentication message, the server may be configured to store the basic device information and ASD credentials so that they do not have to be transferred to the device again. The server keeps the contents of Table 1 "fresh" by tracking the Simple Service Description Protocol (SSDP) device status messages on the network, although it will be appreciated that other approaches may be used.

In response to the message 428, the server 422 sends back an AuthenticationResponse message 430 to the client (renderer). If the server has been able to authenticate the requesting client, this message 430 includes a field indicating that the client device has been authorized for further interaction with the server. If the ASD server cannot authenticate the requesting device, it can send back a message indicating that the authentication request was denied. The ASD server can convey the reason by including an error code in the response message 430, or via an error log which is later sent or accessed.

It is noted that the RequestAuthentication message of the exemplary embodiment is configured to have no effect on the authenticating device's current state; it is only intended to submit information to the server from the client or renderer. As used in the present context, the term "state" refers generally and without limitation to the operating condition or status of the device. For example, the aforementioned RequestAuthentication message would not change or interfere with current machine operations in progress, thereby maintaining transparency and continuity. This is also true of the exemplary RequestPSP message described below. Unlike other UPnP services, the exemplary ASD service described herein is largely action-based. All of the variables exist to support the service actions. The directory is only published or exposed through actions invoked by the client devices.

Table 2 shows examples of various error codes that an ASD server can send to an ASD client in response to a RequestAuthentication message. The column headed "Error Code" lists various error codes sent by the exemplary ASD server. The "short description" column provides a description of each of the error code, and the "Explanation" column provides a more detailed description for each of the errors.

TABLE 2

| Error code | Short Description | Explanation |
|---|---|---|
| 101 | Invalid Parameter Size | Invoked when an invalid parameter size is submitted |
| 201 | Action Failed | The action failed for an unknown reason |
| 301 | Authenticated | Signals to the client that it is authenticated to access asset directories |

TABLE 2-continued

| Error code | Short Description | Explanation |
|---|---|---|
| 401 | Denied | Signals to the client that it has been denied access to the ASD protected content |

The exemplary embodiment of the service (ASDService) for use in a cable network such as that of FIG. 1 comprises a UPnP service that allows renderers and servers to participate in the ASD. The ASDService defines a service that runs on a server device (e.g., CPE 106a) and is invoked by a client or renderer device 106b. The ASDService process in defined for exchanging and authenticating security credentials to different devices in the PLAN. The illustrated embodiment of the ASDService advantageously abides by the UPnP AV Architecture for browsing content, setting up connections, transporting content and controlling the flow of the content between devices. The ASDService is a typically a precursor to the UPNP general playback process. The ASDService is executed before the device can browse the ASD content directory or allow playback. A denial by the ASDService prevents the client CPE 106b from rendering ASD protected content.

The exemplary ASDService depends on the UPnP defined Content Directory Service to find, advertise, browse and control content directories on the server. The ASDService causes the server restrict the presentation or availability of content assets that are ASD-protected until a device has been authenticated by the ASDservice. All ASD protected content can be stored in an "ASD" directory on the server or its storage proxy (e.g., another connected device within the ASD or TD which the server CPE controls, or for which it acts as a "gatekeeper" for content browsing or access. The Content Directory Services running on the server purposely will not expose the content located in the ASD directory or other secure facility over a general "Browse" or "Browse All" command. Rather, the Content Directory Service only exposes the content in response to direct queries of that directory (after proper authentication/authorization). All other aspects of the Content Service Directory function of UPnP are maintained.

The submission of the security package is required each time a renderer accesses content in order for the server to maintain CCI counters to comply with "copy once" and "copy never" classified content.

The exemplary ASD service-type enables a number of functions on the PLAN 202 including, inter alia: (i) allows an ASD capable device to request ASD authentication from the server; (ii) allows an ASD capable device to access the ASD content directory; and (iii) allows an ASD capable rendering device to request security packages for specific content listed in a content directory service by "contentID" and "parentID" (see discussion of these state variables below).

Content Directory Browsing

Figure 5:
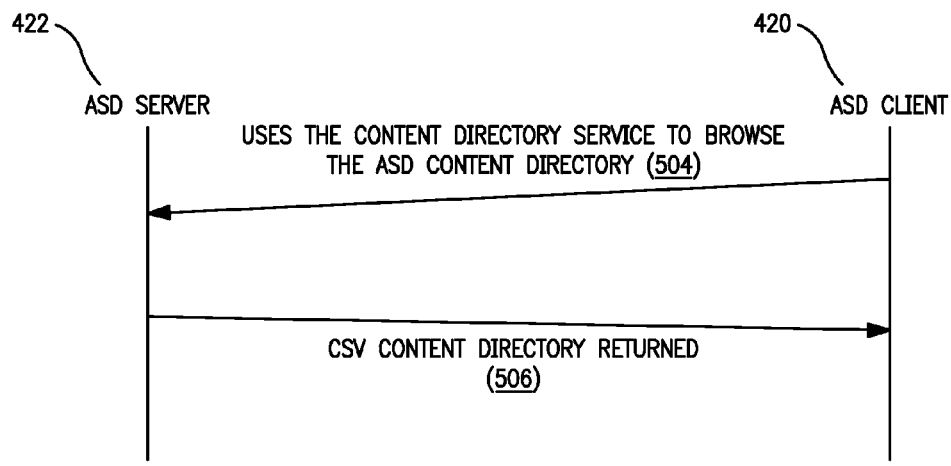
FIG. 5 is a graphical illustration of an exemplary embodiment of an ASD message exchange sequence between a client or renderer process and server process during content browsing.

FIG. 5 shows an exemplary messages exchange between an ASD client process 420 and an ASD server process 422 when a user is browsing through available content. When the user instructs the ASD client to browse through available content, the ASD client 420 sends a content directory service message 504 to the ASD server 422. The ASD server honors this request only if the ASD client is previously authorized (authenticated) by the server. It will be appreciated that yet other criteria may be used to control browsing access, including results of other authentication or authorization procedures, challenge-response, failure to maintain communication channel continuity, too many browsing requests per unit time, user-specified preferences or masks, etc.).

If the client is authorized/authenticated, the server sends back a message that returns the data from the local content directory (which may or may not physically reside on the server device) 506. If the ASD client is not authorized, the server sends a message back indicating an error condition, and refuses access by the ASD client to content within the ASD. The ASD server can use error codes (e.g., those shown in Table 2) or other means to indicate the reason why the content browsing request was rejected.

Content Viewing Request

Figure 6:
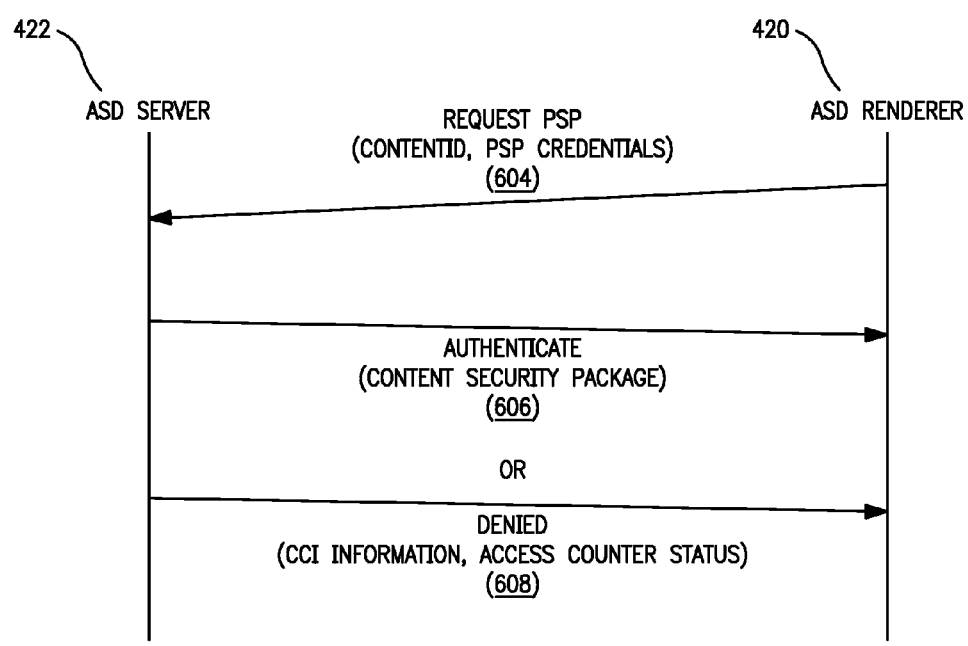
FIG. 6 is a graphical illustration of an exemplary embodiment of an ASD message exchange sequence between a client or renderer process and server process during content selection.

FIG. 6 shows an exemplary message exchange between an ASD renderer process 420 and an ASD server process 422 when the renderer chooses a content title available on the server for access (e.g., viewing). For the renderer to be able to make a request for a specific content title, it should have previously authenticated itself with an ASD server device, and must be able to identify the content it wishes to render. FIG. 6 shows an example of this request, where the renderer requests a server to stream or download content using a RequestPSP message 604. The message contains information about Persistent Streaming Protocol (PSP) credentials of the renderer and identifies the requested content by a sufficiently unique content identification field ContentID.

Table 3 shows an exemplary format of fields that the client (renderer) may include in the aforementioned content viewing request. The first column ("Argument") shows two arguments included in the message: AssetContentID and AssetParentID. These state variables allow an ASD-capable rendering device to request security packages for specific content listed in a content directory service using two variables e.g., defined by UPnP. The second column ("Direction") shows the device that both these arguments are generated by; i.e., the renderer. The third column ("Related State Variable") shows an example state variable that a server receiving the request can assign to each of these arguments listed in the first column.

TABLE 3

| Argument | Direction | RelatedStateVariable |
|---|---|---|
| AssetContentID | IN | AssetContentID |
| AssetParentID | IN | AssetParentID |

The content security package 606 is sent from the server to the renderer if the request 604 is accepted. If the server rejects the renderer's request, it will send a message 608 to this effect, and it may decide to include an error code (such as, for example, one of those shown in Table 2), and also may indicate a specific reason why it did not grant digital rights to the renderer to access the content. For example, the server may indicate that access was not allowed because renderer exceeded the count of viewings allowed for the content.

Appendix I hereto provides exemplary code rendered in extensible markup language (XML) implementing portions of the foregoing message functions according to the invention.

Business/Operational Rules Engine

In another aspect of the invention, an operational or business rules "engine" can be implemented consistent with the invention as a higher layer or supervisory process that imposes particular rules on the previously described server and client processes in order to effect desired business or operations goals. The rules engine can be considered an overlay of sorts to the more fundamental processes used to accomplish required device advertising/discovery, security package negotiation, browsing, etc.

In one embodiment, this rules engine is implemented a computer programs or programs running on one or more of the CPE 106 that are party to a renderer-server transaction. As previously discussed, the server 106a and renderer 106b can implement logic to exchange messages and negotiate a common security framework that can be used for communication. This allows for mixing and matching of different vendor's equipment and overcomes the "single source" economic inefficiency introduced by proprietary conditional access and DRM solutions. The selection and utilization of the particular aspect of this common security framework, as well as other features such as the communication channels that may be used to effectuate scanning, authentication, browsing, and content transfer, may be governed by the higher layer "rules" processes as well.

The supervisory rules may comprise a separate entity or process which is substantially autonomous of the network operator, and may be fully integrated within other processing entities (such as the aforementioned client or server processes 420, 422). Alternatively, the rules engine may be controlled via e.g., a remote MSO user interface such as a GUI on a PC connected to the relevant device via a network interface, so as to allow the MSO to adjust or reprogram aspects of the rules engine, reload it with updates, etc.

Included within these rules are the implementation of security management policies that can increase or enhance: (i) content security or protection, (ii) network optimization and reliability, (iii) subscriber or user satisfaction, (iv) profit or revenue, and so forth.

For example, one rule implemented by the rules engine may comprise only providing certain types or program recording and/or distribution features to certain subscribers or classes of subscribers. The subscriber server CPE 106a may possess UPNP capability for interfacing with and transmitting content to a connected device for example, but the ability to transfer such protected content out of the server CPE 106s not be made available to such subscribers unless they met certain criteria (e.g., "premium" subscription, etc.).

Moreover, premium subscribers might be given a greater scope of options and choices; e.g., the ability to use a wider range of CPE (e.g., new DSTBs introduced in the retail market), while more basic subscribers are limited as to the type of device they may use as part of their subscription.

The present invention also contemplates the partial disclosure of content by a server CPE based on the level of authentication achieved by a renderer device. These levels of authentication may be controlled by the network operator, such as where higher levels of access or authentication are provided to subscribers or users with greater privileges. For example, when a renderer is not authenticated at all, the server CPE may be configured to not give the renderer any access to browsing protected material of any kind. At a higher tier of authentication or permission, the server may give access to the renderer to only a subset of titles, or alternatively all titles, but without access to the substantive content itself (other than perhaps a trailer or preview).

Similarly, a server CPE may be configured by the rules engine to only provide access to content that originated from a cable WAN (e.g., HFC 101) for renderer devices that authenticate themselves as a "cable operator authorized renderer", or provide some other indicia of trust for that particular type or origin of content.

Similarly, different rules or grades of access can be provided to different types of content; e.g., content that is more mature or has been in distribution for a longer period of time may be viewed as less risky from a theft or unauthorized copying standpoint, and hence the authentication level or permissions required to browse and even transfer that content may be relaxed somewhat as compared to new release content.

The server CPE 106 may also segregate content (based, e.g., on AssetContentID or a similar variable) and apply different access and transfer rules based on such segregation. For example, all content with an AssetContentID of a certain form might require extended permissions (e.g., parental control) and authentication before that content can be previewed or transferred.

The server may also be advantageously used as an advertisement platform to provide occasional browsing access to showcased content to attract a user to purchase additional titles, or a subscription or membership.

The business rules engine previously described, or another functional entity within the network, may also be used to implement and enforce so-called "copy once" rules or protection mechanisms of the type well known in the content reproduction and distribution arts. Similar rules such as e.g., "never copy" and "no more copying" can also be implemented as desired. For example, the Philips Video Content Protection System (VCPS), which enables content delivered over a cable network to be marked as "copy once," meaning it can be burned onto VCPS-enabled DVD+R and DVD-RW disks, although many other types of systems and rules are envisaged for use within the current invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

EXEMPLARY CODE
© Copyright 2006 Time Warner Cable, Inc. All rights reserved.

```
<?xml version="1.0"?>
<scpd xmlns="urn: schemas-upnp-org:ASDService-1-0">
   <specVersion>
      <major>1</major>
      <minor>0</minor>
   </specVersion>
   <actionList>
      <action >
      <name>ReguestAuthentication</name>
         <argumentList>
            <argument>
               <name>ClientASDID</name>
                  <direction>in</direction>
            <relatedStateVariable>ClientASDID</relatedStateVariable>
            </argument>
         <argument>
```

APPENDIX I-continued

EXEMPLARY CODE
© Copyright 2006 Time Warner Cable, Inc. All rights reserved.

```
            <name>ClientASDPEK</name>
            <direction>in</direction>
        <relatedStateVariable>ClientASDPEK</relatedStateVariable>
        </argument>
        <argument>
            <name>clientASDPSK<name>
            <direction>in</direction>
        <relatedStateVariable>ClientASDPSK</relatedStateVariable>
        </argument>
        <argument>
            <name>ClientHostID</name>
            <direction>in</direction>
        <relatedStateVariable>ClientHostID</relatedStateVariable>
        </argument>
        <argument>
            <name>ClientHostPEK</name>
            <direction>in</direction>
        <relatedStateVariable>ClientHostPEK</relatedStateVariable>
        </argument>
        <argument>
            <name>ClientHostPSK</name>
            <direction>in</direction>
        <relatedStateVariable>ClientHostPSK</relatedStateVariable>
        </argument>
        </argumentList>
    </action>
<action>
    <name>RequestPSP</name>
        <argumentList>
        <argument>
            <name>AssetContentID</name>
            <direction>in</direction>       <relatedStateVariable>
        AssetContentID</relatedStateVariable>
        </argument>
        <argument>
            <name>AssetParentID</name>
            <direction>in</direction>
        <relatedStateVariable>AssetParentID</relatedStateVariable>
        </argument>
        </argumentList>
    </action>
    [OTHER DECLARATIONS]
</actionList>
</scpd>
```

What is claimed is:

1. A method of sharing protected digital content between two client premises devices associated with a premises network, comprising:
storing protected digital content at a first of said two client premises devices;
said first client premises device authenticating a second of said client premises devices requesting access to said protected digital content from said first client premises device, said authentication comprising determining rights of said second client premises device to access said protected digital content, and said first and second client premises devices thereby creating an authorized service domain (ASD) for maintaining protection of said protected digital content;
selectively providing access to said second client premises device for browsing said protected digital content;
receiving a request for transmission of at least a portion of said protected digital content; and
said first client premises device selectively transmitting said at least portion of said protected digital content to said second client premises device while maintaining said content protection;
wherein said selective transmission is conducted entirely between said two client premises devices, and is irrespective of any network entities outside said premises network.

2. The method of claim 1, wherein at least said acts of authenticating, providing access, and transmitting are performed without access to a remote network agent.

3. The method of claim 2, wherein said network comprises a premises local area network (LAN), and said remote agent comprises a head-end process of a cable television network with which at least a portion of said LAN is in communication.

4. The method of claim 1, wherein said stored digital content comprises a plurality of media files each having a respective unique title, and said act of selectively providing access for browsing comprises providing access to at least said titles.

5. The method of claim 1, further comprising verifying that said second client premises device comprises security provisions needed for protecting said content before said act of transferring is commenced.

6. The method of claim 1, further comprising placing said first and second client premises devices in data communication with one another via a standardized communications interface.

7. The method of claim 6, wherein said communications interface comprises a Universal Plug and Play (UPnP) interface, and said first client premises device completes said authentication using a standardized security architecture.

8. User premises apparatus configured as a content server for one or more devices over a user premises network, said user premises server apparatus comprising:
storage apparatus configured to store a plurality of digital content;
authentication apparatus configured to authenticate at least one device requesting content from said server apparatus;
browsing apparatus configured to enable at least one requesting device to browse a directory of available ones of said plurality of content; and
security apparatus configured to control access to said content by said browsing apparatus based at least in part on successful authentication of said at least one requesting device, said browsing apparatus and said at least one requesting device comprising an authorized service domain (ASD) for protection of said content.

9. The server apparatus of claim 8, further comprising transmission apparatus, said transmission apparatus configured to transfer at least a portion of said plurality of content to said requesting device based at least in part on said successful authentication thereof.

10. The server apparatus of claim 9, wherein said transmission apparatus comprises a plug-and-play operable data interface, and said transfer of said at least portion of content is further based on said security apparatus determining that said requesting device possesses a security apparatus used to protect at least one aspect of said at least portion of content to be transferred.

11. The server apparatus of claim 8, wherein said authentication apparatus and security apparatus comprise at least one computer program disposed on said server apparatus within a security architecture.

12. The server apparatus of claim 11, wherein said security architecture comprises a secure microprocessor, and said server apparatus comprises at least a portion of a trusted domain (TD).

13. The server apparatus of claim 8, wherein said server apparatus is granted access to said digital content based at least in part on cryptographic elements and encrypted software downloaded from a network operator entity to a secure microprocessor resident on said server apparatus.

14. The server apparatus of claim 8, wherein said server apparatus further comprises:
- a first interface capable of at least receiving said content from a content-based network;
- a coaxial cable interface configured to provide networking throughout at least a portion of said premises over coaxial cable present therein; and
- a wireless access interface configured to support at least one wireless network within said premises;
- wherein said content is accessible to users on both said coaxial cable network and said at least one wireless network.

15. A system for sharing protected digital content over a premises network, said system comprising at least a first device in communication with said premises network, said first device configured to:
- receive said protected content over an interface to a content delivery network;
- store said content on said first device;
- receive a query from a second device in communication with said premises network, said query requesting security framework capabilities of said first device;
- receive in response to an answer to said query, a request for access to said content from said second device;
- authenticate said second device when said second device requests access to said digital content from said first device, said authentication comprising verification that said second device is compatible with said security framework capabilities of said first device;
- create an authorized service domain (ASD) comprising said first and second devices, said ASD configured to maintain protection of said protected digital content;
- selectively provide access to said second device for browsing said stored digital content;
- receive a request for transmission of at least a portion of said content; and
- selectively transmit said at least portion of said content to said second device while maintaining said content protection.

16. The system of claim 15, wherein said first device comprises a plug-and-play interface over which at least said protected content can be transmitted.

17. The system of claim 15, wherein said first device comprises a storage device having a plurality of security-related information stored therein, at least a portion of said security-related information being used to perform said authentication.

18. The system of claim 15, wherein said first device comprises a secure microprocessor having a plurality of security-related information stored therein, said information being received from said content delivery network according to a downloadable conditional access protocol, at least a portion of said security-related information being used to perform said authentication of said second device.

19. A method of providing a premises network configured to enable sharing of plurality of protected content between a plurality of devices associated with said premises network without requiring said plurality of devices to access a remote network agent, said method comprising:
- storing said plurality of protected content at a first of said plurality of devices;
- creating a directory of said plurality of protected content, said directory indicating at least a title for individual ones of said plurality of protected content;
- establishing an authorized service domain (ASD) for maintaining protection of said plurality of protected content, said plurality of devices communicating within said ASD via said premises network;
- authenticating a second of said plurality of devices to said first of said plurality of devices via said ASD to enable communication of content therebetween;
- selectively providing access to said second of said plurality of devices to said directory, said access enabling said second of said plurality of devices to browse said plurality of protected content stored at said first of said plurality of devices by at least said titles; and
- upon receipt of a selection of at least one of said plurality of protected content, transmitting said at least one of said plurality of protected content and digital copyright data relating thereto to said second of said plurality of devices;
- wherein said transmission of said at least one of said plurality of protected content and said digital copyright data relating thereto to said second of said plurality of devices is based at least in part on said authentication; and
- wherein said transmission of said at least one of said plurality of protected content occurs in an absence of intervention by entities outside said premises network.

20. The method of claim 19, wherein said act of enabling said second of said plurality of devices to browse said plurality of protected content comprises providing a preview of said content associated with said titles.

21. The method of claim 19, further comprising verifying that said second of said plurality of devices comprises security provisions which are adequate for protecting said plurality of protected content prior to said transmission of said at least one of said plurality of protected content thereto.

22. The method of claim 19, wherein said act of communication within said ASD via said premises network between said plurality of devices comprises utilization of a Universal Plug and Play (UPnP) interface.

23. The method of claim 19, wherein said act of communication within said ASD via said premises network between said plurality of devices comprises utilization of a high-speed serialized bus protocol capable of at least 800 Mbps data transfer rate.

24. The method of claim 19, wherein said plurality of protected content is encrypted before said act of transmitting, and said second of said plurality of devices may decrypt said protected content using at least one decryption algorithm and at least a portion of a public-private key pair.

25. The method of claim 19, wherein said selectively providing access to said second of said plurality of devices to said directory further comprises said second of said plurality of devices to re-authenticate itself when said second of said plurality of devices changes said directory that said second of said plurality of devices is browsing.

26. The method of claim 19, further comprising transferring security capabilities information between said first and second of said plurality of devices.

27. The method of claim 26, wherein said capabilities information comprises information relating to at least one of: (i) a public-private key pair, and (ii) an encryption algorithm.

28. A first consumer device in communication with a premises network for sharing protected digital content over said premises network, said first device comprising:
- a first interface configured to receive said protected content from a content delivery network;
- a second interface configured to communicate with a second device in said premises network;
- a storage entity configured to store said protected content;
- a processor comprising at least one computer program configured to:

receive from said second device a request for security framework capabilities of said first device;

provide said security framework capabilities of said first device to said second device via said second interface;

receive a request for access to said protected content from said second device;

authenticate said second device as being within an authorized service domain (ASD);

transmit a directory of said protected content stored at said first device to said second device for browsing thereof;

receive a selection of an individual one of said protected content; and selectively transmit said individual one of said protected content to said second device while maintaining said content protection.

29. The device of claim 28, wherein said provision of said security framework capabilities of said first device to said second device via said second interface occur upon receipt of a request therefore from said second device.

30. The device of claim 28, wherein said act to authenticate said second device as being within said ASD further comprises said at least one computer program being further configured to verify said second device to a device list, said device list comprises devices authorized to be within said ASD.

31. The device of claim 28, wherein said second interface comprises a plug-and-play interface over which at least said protected content can be transmitted to said second device in said premises network.

32. The device of claim 28, wherein said storage entity is further configured to store a plurality of security-related information therein, at least a portion of said security-related information being used to perform said authentication.

33. The device of claim 28, further comprising a secure microprocessor having a plurality of security-related information stored therein, said information being received from said content delivery network according to a downloadable conditional access protocol.

34. The device of claim 33, wherein at least a portion of said security-related information is used to perform said authentication of said second device.

35. The device of claim 28, wherein said browsing of said directory of said protected content stored at said first device comprises providing a preview of said protected content.

36. The device of claim 28, wherein said at least one computer program is further configured to verify that said second device comprises security provisions needed for protecting said content before said act of transmitting is commenced.

* * * * *